United States Patent
Enis et al.

(10) Patent No.: US 9,776,132 B2
(45) Date of Patent: Oct. 3, 2017

(54) METHOD AND APPARATUS FOR REMOVING CARBON DIOXIDE GAS FROM COAL COMBUSTION POWER PLANTS

(76) Inventors: Ben M. Enis, Henderson, NV (US); Paul Lieberman, Torrance, CA (US)

( * ) Notice: Subject to any disclaimer, the term of this patent is extended or adjusted under 35 U.S.C. 154(b) by 1095 days.

(21) Appl. No.: 12/321,689

(22) Filed: Jan. 23, 2009

(65) Prior Publication Data

US 2009/0205364 A1  Aug. 20, 2009

Related U.S. Application Data

(60) Provisional application No. 61/011,955, filed on Jan. 23, 2008, provisional application No. 61/195,418, filed on Oct. 7, 2008.

(51) Int. Cl.
*F25J 1/00*    (2006.01)
*B01D 53/73*   (2006.01)
(Continued)

(52) U.S. Cl.
CPC .............. *B01D 53/73* (2013.01); *B01D 7/02* (2013.01); *B01D 2257/504* (2013.01);
(Continued)

(58) Field of Classification Search
CPC .......... F25J 1/007; F25J 3/067; F25J 2210/70; F25J 2215/80; F25J 2220/80–2220/84; F25J 2260/80; Y02C 10/04; Y02C 10/06; Y02C 10/00; Y02C 10/02; Y02C 10/08; Y02C 10/10; Y02C 10/12; Y02C 10/14; C01B 31/22; F23J 15/02

USPC ....... 62/60, 66–70, 602, 604, 172, 169, 605; 60/39.12, 39.464, 784, 785, 728, 39.182, 60/39.5

See application file for complete search history.

(56) References Cited

U.S. PATENT DOCUMENTS 1,927,175 A * 9/1933 Josephson ...................... 62/603
2,016,815 A   10/1935 Gilmore et. al.
(Continued)

FOREIGN PATENT DOCUMENTS

EP  1577262  * 9/2005 .............. B01J 19/06
GB   477834  * 12/1937 .............. C01B 31/22

OTHER PUBLICATIONS

Kris De Decker, Carbon Sequestration: Bury the idea, not the CO2, Low Tech Megazine, Jun. 29, 2008.

*Primary Examiner* — Frantz Jules
*Assistant Examiner* — Webeshet Mengesha
(74) *Attorney, Agent, or Firm* — MU P.C.

(57) ABSTRACT

The invention relates to a method and apparatus for removing $CO_2$ gas emissions from a coal combustion power plant, comprising a means for physically removing the $CO_2$ gas from the coal, and then using a turbo compressor and turbo expander device to produce super chilled air, which can then be mixed with the $CO_2$ gas to form frozen $CO_2$ crystals which can agglomerate together to form dry ice blocks, wherein the ice blocks can be easily transported and stored, and/or used for commercial purposes (such as for the beverage industry). The heating (compression) and cooling (expansion) processes preferably generate additional energy which can then be used to offset the substantial costs associated with separating the $CO_2$ gas from the coal.

2 Claims, 11 Drawing Sheets

(51) Int. Cl.
  *B01D 7/02* (2006.01)
  *F23J 15/02* (2006.01)
  *F25J 3/06* (2006.01)

(52) U.S. Cl.
  CPC ............... *F23J 15/02* (2013.01); *F25J 1/007* (2013.01); *F25J 3/067* (2013.01); *F25J 2210/70* (2013.01); *F25J 2215/80* (2013.01); *F25J 2220/80* (2013.01); *F25J 2220/84* (2013.01); *F25J 2260/80* (2013.01); *Y02C 10/00* (2013.01); *Y02C 10/02* (2013.01); *Y02C 10/04* (2013.01); *Y02C 10/06* (2013.01); *Y02C 10/08* (2013.01); *Y02C 10/10* (2013.01); *Y02C 10/12* (2013.01); *Y02C 10/14* (2013.01); *Y02E 20/326* (2013.01); *Y02P 70/34* (2015.11)

(56) References Cited

U.S. PATENT DOCUMENTS

| | | | |
|---|---|---|---|
| 3,124,442 A * | 3/1964 | Rich | 62/602 |
| 3,717,286 A * | 2/1973 | Crider | 222/143 |
| 3,901,044 A * | 8/1975 | Vahl | 62/605 |
| 5,724,805 A * | 3/1998 | Golomb et al. | 60/783 |
| 5,861,051 A | 1/1999 | Critchfield et al. | |
| 6,572,680 B2 | 6/2003 | Baker et al. | |
| 2005/0120878 A1 | 6/2005 | Leppin et al. | |
| 2006/0137390 A1 | 6/2006 | Iverson | |
| 2007/0144415 A1 | 6/2007 | Varagani et al. | |
| 2007/0182160 A1 | 8/2007 | Enis et al. | |

* cited by examiner

| | | 487.67 pounds/sec air | | 0.948 (BTU/sec)/kW | | | |
|---|---|---|---|---|---|---|---|
| PRESSURE | TEMPERATURE | DENSITY | ENTHALPY | ENTROPY | POWER | | EFFICIENCY |
| P | T | RHO | H | S | | | |
| PSIA | F | #/CU FT | BTU/# | BTU/(# F) | kW | | |
| COMPRESSOR | | | | | | | |
| 14.67 | 70 | 0.074764 | 126.71 | 1.6366 | | | |
| 50 | 291.33 | 0.17951 | 180.06 | 1.6366 | 27,444 | COMPRESSOR RATING | |
| | | | 172.0575 | | | | 85% |
| 50 | 258.43 | 0.18777 | 172.06 | 1.6257 | -4,115 | COMPRESSOR FRICTION LOSS | |
| HEAT EXCHANGER #1 | | | | | | | |
| | | | | | -23,458 | MAXIMUM TRANSFER TO COOLANT | |
| 50 | 70 | 0.25504 | 126.46 | 1.5521 | | | |
| TURBOCOMPRESSOR | | | | | | | |
| 215 | 302.79 | 0.75806 | 182.39 | 1.5394 | 28,772 | TURBOCOMPRESSOR RATING | |
| | | | 174.0005 | | -4,316 | TURBOCOMPRESSOR FRICTION LOSS | 85% |
| 215 | 268.58 | 0.7941 | 174 | 1.5281 | | | |
| HEAT EXCHANGER #2 | | | | | | | |
| 215 | 70 | 1.1005 | 125.32 | 1.4501 | -25,042 | MAXIMUM TRANSFER TO COOLANT | |
| TURBOEXPANDER | | | | | | | |
| 30 | -159.57 | 0.27225 | 71.163 | 1.4501 | -27,859 | TURBOEXPANDER RATING | |
| | | | 79.28655 | | -4,179 | TURBOEXPANDER FRICTION LOSS | 85% |
| 30 | -126.1 | 0.24426 | 79.287 | 1.4758 | | | |

85%

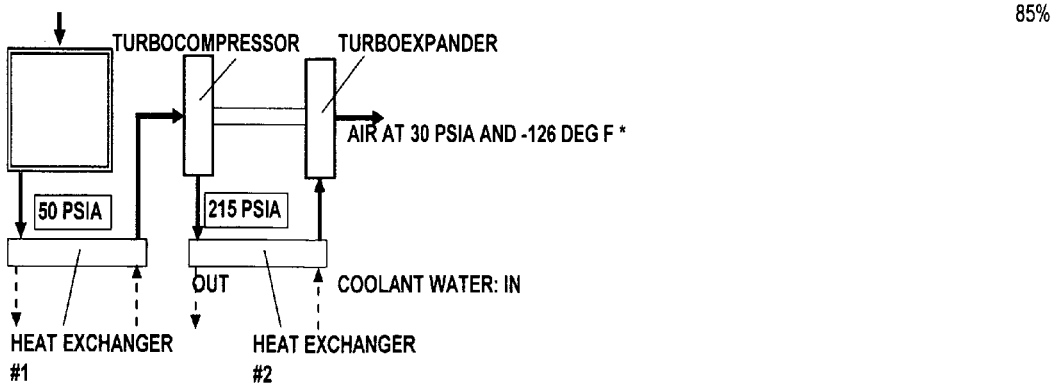

\* SYSTEM CAN BE DESIGNED TO
DISCHARGE AIR AT 14.67 PSIA AND -180 DEG F

HEAT BALANCE
FOR
MATCHING FLUE OUTPUT OF "CO2 FREEZING" OUTPUT TO TURBOEXPANDER OUTPUT

Bituminous Coal Heat Release
   13,100 BTU/LB
Coal Consumption in Power Plant
   100 MW
   100,000 kW
    0.948 (BTU/SEC)/kW
   94,800 BTU/SEC
    7.24 LB/SEC coal consumption
Ideal Chemical Reaction
$$C + O_2 + 3.76\ N_2 \longrightarrow CO_2 + 3.762\ N_2$$
   12 LBS carbon consumed
   44 LBS carbon dioxide generated
    3.67 LBS carbon dioxide generated per pound of carbon
   26.53 LBS/SEC carbon dioxide generated in 100 MW plant Chilling of CO2 gas to solid
    70 deg F
   -109.3 deg F freezing point of CO2
    0.189 BTU/(LB deg F)
   246 BTU/LB heat of sublimation
   279.9 BTU/LB requried chilling
  7,426.6 BTU/SEC required chilling rate
Turboexpander expansion requirments to match CO2 chilling rate
    86.34 BTU/# AIR REQUIRED BY COMPRESSOR
   0.00134 (kW/SCFM)/(BTU/#)
   0.115696 (kW/SCFM)
   10,213 kW REQUIRED BY COMPRESSOR
   385,000 SCFM
   6,416.67 SCFS
    0.076 LB/SCF
   487.67 LB/SEC -173 deg F exhaust temperature of air from turboexpander
   -109.3 F freezing temperture of CO2
    0.24 BTU/(LB deg F)
   487.67 LB/SEC chilled air
  7,455.4 BTU/SEC available chilling rate

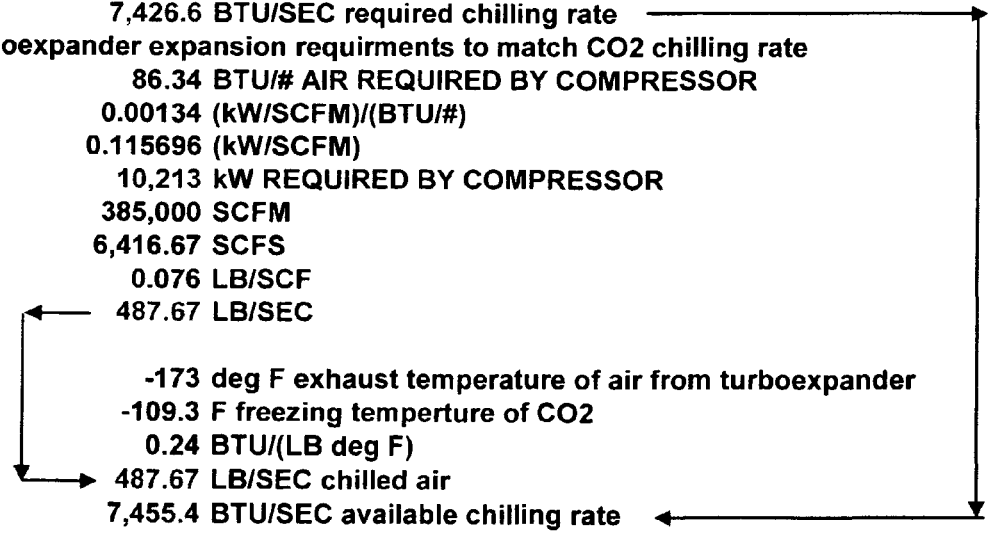

| | |
|---|---|
| 14 | CO2 PIPES |
| 230.7 CU FT/SEC | CO2 TOTAL FLOW |
| 16.5 CU FT/SEC | CO2 FLOW PER PIPE |
| 20 FT/SEC | CO2 FLOW VELOCITY PER PIPE |
| 0.82 SQ FT | CO2 FLOW AREA PER PIPE |
| 1.0 FT | DIAMETER PER PIPE |
| | |
| 6 | AIR PIPES |
| 5,377 CU FT/SEC | AIR INFLOW |
| 896 CU FT/SEC | AIR INFLOW PER PIPE |
| 10 FT/SEC | AIR FLOW VELOCITY PER PIPE |
| 89.61 SQ FT | AIR FLOW AREA PER PIPE |
| 10.7 FT | DIAMETER PER PIPE |
| | |
| 1 | AIR PIPES |
| 5,377 CU FT/SEC | AIR OUTFLOW |
| 5,377 CU FT/SEC | AIR OUTFLOW |
| 20 FT/SEC | AIR FLOW VELOCITY PER PIPE |
| 268.84 SQ FT | AIR OUTFLOW AREA |
| 18.5 FT | DIAMETER OUTFLOW PIPE |

FIGURE 11

| | |
|---|---|
| 100 MW | POWERPLANT |
| 7.24 #/SEC | COAL CONSUMPTION |
| 26.53 #/SEC | CO2 |
| 0.115 #/CU FT | CO2 |
| 230.70 CU FT/SEC | CO2 |
| 487.67 #/SEC | AIR |
| 0.0907 #/CU FT | AIR at -173 F |
| 5,376.7 CU FT/SEC | AIR at -173 F |
| 5,607.4 CU FT/SEC | CO2 + AIR |
| 5 FT/SEC | DOWNWARD VELOCITY OF GASES |
| 1121.5 SQ FT | CROSS SECTION OF VAT |
| 36.5 FT | DEPTH OF RECTANGULAR CROSS-SECTION VAT |
| 36.4 FT | SCREW DIAMETER |
| 30.7 FT | WIDTH OF RECTANGULAR CROSS-SECTION VAT |
| 8 SEC | RESIDENCE TIME IN VAT |
| 40 FT | HEIGHT OF VAT |

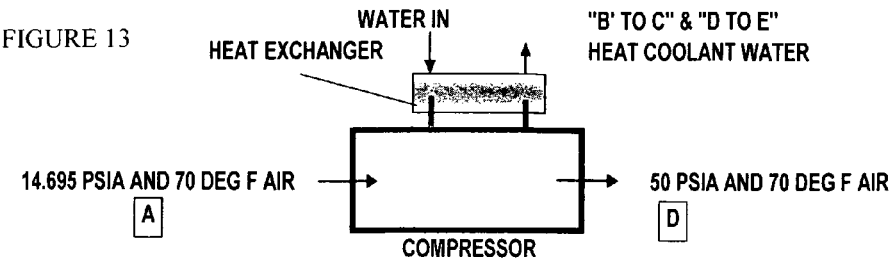

| STATE POINT | ABSOLUTE PRESSURE (psia) | TEMPERATURE (deg F) | DENSITY pound/cu ft | ENTHALPY BTU/pound | ENTROPY BTU/(pound- deg R) | EFFICIENCY | |
|---|---|---|---|---|---|---|---|
| A | 14.696 | 70 | 0.074897 | 126.71 | 1.6365 | | |
| B' | 50 | 291.03 | 0.17959 | 179.98 | 1.6365 | | |
| | | | | 10.654 | | | TO COOLANT WATER |
| B' TO C | | | | 169.326 | | 80% | |
| C | 50 | 247.18 | 0.19076 | 169.33 | 1.6219 | | |
| | | | | 42.87 | | | HEAT EXCHANGER C |
| D | 50 | 70 | 0.25504 | 126.46 | 1.5521 | | |

| STATE POINT | ABSOLUTE PRESSURE (psia) | TEMPERATURE (deg F) | DENSITY pound/cu ft | ENTHALPY BTU/pound | ENTROPY BTU/(pound- deg R) | EFFICIENCY | |
|---|---|---|---|---|---|---|---|
| 1 | 50 | 70 | 0.25504 | 126.46 | 1.5521 | | |
| 2' | 135 | 243.93 | 0.5169 | 168.24 | 1.5521 | 0.17366 | 35.51 BTU/POUND DIFF. |
| | | | | 6.267 | | | TO T/C COOLANT WATER |
| | | | | 161.973 | | 85% | |
| 2 | 135 | 218.24 | 0.53671 | 161.97 | 1.543 | | |
| | | | | 36.1 | | | TO HEAT EXCHANGER |
| 3 | 135 | 70 | 0.68991 | 125.87 | 1.4829 | | |
| 4' | 220 | 149.77 | 0.97426 | 144.87 | 1.4829 | | 16.15 BTU/POUND DIFF. |
| | | | | 2.85 | | | |
| | | | | 142.02 | | 85% | |
| 4 | 220 | 138.12 | 0.99376 | 142.02 | 1.4782 | | |
| | | | | 16.73 | | | TO HEAT EXCHANGER |
| 5 | 220 | 70 | 1.1262 | 125.29 | 1.4484 | | |
| 6' | 55 | -104.78 | 0.42219 | 84.07 | 1.4484 | | -35.037 BTU/POUND DIFF. |
| | | | | -6.183 | | | |
| | | | | 90.253 | | 85% | |
| 6 | 55 | -79.383 | 0.39315 | 90.253 | 1.4652 | | |
| 7' | 24 | -160.18 | 0.21785 | 71.137 | 1.4652 | | -16.2486 BTU/POUND DIFF. |
| | | | | -2.8674 | | | |
| | | | | 74.0044 | | 85% | |
| 7 | 24 | -148.35 | 0.20938 | 74.004 | 1.4746 | | |

FIGURE 14

METHOD AND APPARATUS FOR REMOVING CARBON DIOXIDE GAS FROM COAL COMBUSTION POWER PLANTS

RELATED APPLICATION

This application claims priority from U.S. Provisional Application Ser. Nos. 61/011,955, filed Jan. 23, 2008, and 61/195,418, filed Oct. 7, 2008, which are incorporated herein by reference in their entirety.

BACKGROUND OF THE INVENTION

At the current rate of usage, there is estimated to be about 300 years of coal deposits left in mines across the U.S.A. Coal is a valuable natural resource that represents one of the most abundant and efficient sources of energy available in the U.S. today. At the same time, there are also serious environmental hazards and consequences associated with the use of coal, including the emission of carbon dioxide gas which can lead to global warming and other climate changes.

Greenhouse gases are found in the earth's atmosphere and contribute to the greenhouse effect. In the absence of the greenhouse effect, the mean temperature of the earth could be reduced to about minus 19 degrees C. (or minus 2 degrees F.) rather than the present mean temperature of about 15 degrees C. (or 59 degrees F.), thereby making the earth uninhabitable. On the other hand, with an increase in greenhouse gases, the earth could experience the opposite effect—global warming.

Greenhouse gases include in the order of relative abundance water vapor, carbon dioxide, methane, nitrous oxide, and ozone, among others. The majority of these green house gases exist in nature, but the extent to which any one particular gas, such as carbon dioxide, is increased can change due to human activity.

Of the major greenhouse gases existing on the earth today, water vapor is estimated to cause about 36-70% of the overall greenhouse effect (not including clouds); carbon dioxide is estimated to cause about 9-26%; methane is estimated to cause about 4-9%, and ozone is estimated to cause about 3-7%. It is not possible to determine the exact percentage of the greenhouse effect caused by any one gas because the influences of the various gases are not additive. For example, the higher end of the ranges are for one gas alone, whereas, the lower ends are for the gases including overlaps. Other greenhouse gases include, but are not limited to, nitrous oxide, sulfur hexafluoride, hydrofluorocarbons, perfluorocarbons and chlorofluorocarbons.

One of the main contributors to global warming is believed to be the increase in carbon dioxide gas emitted into the earth's atmosphere by various man-made activities and technologies. Of the main contributors to carbon dioxide emissions that can affect the earth's atmosphere and therefore increase global warming, the top seven are listed below (with percentage contributions for 2000-2004):

1. Solid fuels (e.g. coal): 35%
2. Liquid fuels (e.g. gasoline): 36%
3. Gaseous fuels (e.g. natural gas): 20%
4. Flaring gas industrially and at wells: <1%
5. Cement production: 3%
6. Non-fuel hydrocarbons: <1%
7. The "international bunkers" of shipping and air transport not included in national inventories: 4%

While there is a strong motivation to use coal for the generation of energy due to its efficiency and abundance, there is also a strong interest in eliminating the undesired emissions of carbon dioxide gas into the atmosphere created by the combustion of coal in standard coal combustion power plants.

One of the existing technologies used to eliminate excess carbon dioxide emissions involves "capturing" the $CO_2$ as it is being emitted from smokestacks, wherein the intent is to store the carbon dioxide in various locations, including underground reservoirs, oceans, rocks, consumer products, chemicals or fuels. The idea of carbon capture and storage (CCS)—first introduced in the 1970's—began by making use of existing underground reservoirs in which to store the $CO_2$ gas. In this respect, it may be worth mentioning that there are many natural reservoirs of $CO_2$ that have been in existence and contained the gas for millions of years. Moreover, the available storage space in underground reservoirs (such as depleted oil and gas reserves, coal formations and saline formations) is probably large enough to store all the carbon dioxide gas contained in all the remaining fossil fuel reserves.

Recently, leading science and energy institutes advocated strongly for the further development of carbon capture and storage technology. For example, in June of 2008, the science academies of the world's 13 major economic powers called the implementation of carbon sequestration a "top priority." At about the same time, the International Energy Association (IEA) argued for an energy technology revolution of which carbon capture and storage is to form a vital component. Meanwhile, many spin-offs and start-ups are presenting various "innovative" ideas that differ from the traditional approach of storing $CO_2$ in underground caverns and reservoirs.

For example, capturing $CO_2$ from smokestacks for the purification of natural gas or at ammonia production facilities has been a common practice for many years. Moreover, injection and storage of carbon dioxide is already occurring in the North Sea, Algeria, and Texas, and in these cases, $CO_2$ is being injected into oil and gas reservoirs, which provides the added benefit of being able to extract more fossil fuel than would otherwise be possible using a process called Enhanced Oil Recovery (EOR). And, for some of these applications, carbon dioxide is transported by a pipeline or by ship.

While some of these technologies have gained credibility in recent years, many experts still believe that because of the rapid use of the world's remaining fossil fuel supplies, it is necessary to further lower the environmental impact caused by these technologies in an effort to prevent catastrophic climate changes. The problem at hand, nevertheless, is that the process of capturing, transporting and storing carbon dioxide gas from coal combustion power plants can dramatically raise energy consumption costs and cause serious health and environmental issues and concerns. For example, if the energy used to capture $CO_2$ emissions is derived directly from the fossil fuels themselves, the benefits of the $CO_2$ savings by capture and storage will be offset by the very same energy intensive process. And, if the energy comes from renewable sources, the technology would be rendered unnecessary as it would be much more efficient to generate electricity directly from the renewable source.

Indeed, it has been discovered that capturing $CO_2$ from smokestacks and compressing it for transport can be one of the most energy-intensive parts of the process. According to the International Panel of Climate Change (IPCC), which prepared a comprehensive study three years ago, capturing technology (including compression of the gas for further transport and storage) can raise the energy consumption of a coal combustion power plant by an average of 32 percent.

It is also insufficient to simply place the smokestacks of a coal plant upside down as suitable underground reservoirs do not necessarily lie beneath the world's power stations. A carbon capture and storage infrastructure also requires a transport infrastructure such as those consisting of pipelines (and tankers) that rival the existing oil and gas network. And manufacturing and installing these thousands of miles of pipelines will require a substantial amount of cost and effort. Moreover, it will take not only more research to find out which reservoirs are suitable for storage and which ones aren't, but the injection of $CO_2$ into underground reservoirs and the monitoring of the transport network (today's pipelines are patrolled by plane every two weeks), as well as the transportation of gas by shipping or pipeline, will typically require significant effort and expense.

Capturing carbon dioxide in rocks also requires a mining and transport infrastructure that is comparable to today's coal industry. For example, to fix a ton of $CO_2$, it is estimated that 1.6 to 3.7 tons of rock would be needed. Not only would these rocks have to be mined and transported to coal plants, but the amount of industrial wastes and mining tailings that can be salvaged—for example, fuel ash from coal plants or de-inking ash from the paper industry—are too small to substantially help offset the cost of the mining and transporting that would be required. The process also generates large amounts of waste materials (apart from the carbonised rocks themselves), and for every ton of carbon dioxide stored in rock, 2.87 to 45.18 tons of disposable materials would be created.

Some attempts have been made in the past to store carbon dioxide in unminable coal beds which are potentially large storage reservoirs for the sequestration of anthropogenic $CO_2$. This solution offers the benefit of enhanced methane production, which could potentially offset some of the costs associated with $CO_2$ sequestration. Nevertheless, the results of a careful study of the economic feasibility of such processes now show that injecting flue gas into unminable coal bed seams to recover methane from coal bed methane (CBM) fields is only marginally economical, and will not significantly contribute to the world's carbon dioxide sequestration needs.

Taking all of the above factors into account, it is estimated that Carbon Capture and Storage will probably raise energy consumption in any given application by as much as fifty percent, and therefore, even if all of the $CO_2$ can eventually be separated and stored, such an increase in energy consumption and costs may be too high of a price to pay to keep the environment clean. For all of the above reasons, a new and improved method and apparatus is needed for the capture and storage of $CO_2$ gases emitted from coal combustion power plants, to overcome the high costs and disadvantages associated with current carbon dioxide extraction and removal processes, such that the world's coal reserves can be used without the consequences of adding to man-made global climate changes, and the high cost of producing energy.

SUMMARY OF THE INVENTION

Despite some of the negative views discussed above, the increasing interest in environmental concerns relative to the use of coal has recently led to the development of certain clean coal technologies designed to enhance both the efficiency and environmental acceptability of coal extraction, preparation and use, and in particular, power generation. There are several available processes that have been developed to separate carbon dioxide gas from the flue gases (mixture of water vapor and $NO_x$ gases) that emanate from standard coal power plants.

Two such processes are: (1) the membrane process, and (2) contact with a solution. An example of the membrane process is described in U.S. Pat. No. 6,572,680, which issued on Jun. 3, 2003, entitled "Carbon dioxide gas separation using organic-vapor-resistant membranes," and an example of the contact solution process is described in U.S. Pat. No. 5,861,051, which issued on Jan. 19, 1999, entitled "Process for removing carbon dioxide from gas mixture."

Among those processes that have been developed, a system referred to as Integrated Gasification Combined Cycle technology (hereinafter "IGCC") is particularly promising since it allows both power generation and the production of environmentally friendly fuel, e.g., hydrogen. The IGCC process produces hydrogen for combustion in an electric power generator, as well as a stream of cool carbon dioxide gas, which can then be separated, captured and sequestered, to help eliminate $CO_2$ emissions from the power plant associated with the IGCC into the earth's atmosphere.

The process essentially comprises two general technologies: coal gasification and combined-cycle power generation. Coal gasification is a process that produces a clean synthetic gas (syngas) that can be used as the fuel for a gas combustion turbine. Syngas is created when coal is reacted with steam and air or oxygen under high temperatures and pressures to produce a gaseous fuel mainly consisting of hydrogen and carbon monoxide. The syngas is then processed in a water-gas-shift reactor which converts the CO to $CO_2$ and increases the $CO_2$ and $H_2$ molecular concentrations. It results in the carbon compounds being reacted to form $CO_2$, which can then be easily removed, and because $CO_2$ is present at much higher concentrations in syngas than in post-combustion flue gas, $CO_2$ capture is less expensive using pre-combustion techniques than post-combustion capture methods.

After syngas is cleaned by a gas cleanup process, it can be burned in the Combined Cycle Gas Turbine process ("CCGT") to produce electricity. That is, after the pollutants are removed, electricity is generated using the following process: 1) a gas turbine-generator is used to burn the syngas, 2) heat from the gasification and the exhaust heat from the gas turbine generator are used to create steam, and 3) steam is used to power a steam turbine-generator which produces electricity. The overall process is designed to reduce the environmental impact of coal combustion power plants through the integration of gasification and suitable downstream syngas treatment for power and hydrogen enriched stream production.

Nevertheless, the main problems associated with IGCC relate to the following key disadvantages: (1) excess power loss, (2) the high cost of transporting $CO_2$, and (3) the high cost of sequestering $CO_2$. The main goal of the present system is to reduce and in some configurations entirely eliminate power loss, as well as the need to transport the collected gas by expensive pipelines, and the need to sequester the gas. And, for purposes of the present invention, the interest in IGCC lies in being able to use existing IGCC systems to separate the carbon monoxide and carbon dioxide gases from the plant's flue gases, such that they can be removed from the plant's emissions, and then processed so that they can easily be transported and stored.

The proposed solution captures the $CO_2$ gases emitted from a coal combustion power plant using virtually any conventional method, such as IGCC, and focuses primarily on freezing the $CO_2$ gas and capturing it, storing it and delivering it. That is, in the proposed solution, the $CO_2$ gas is preferably chilled and desublimated by interaction with super-chilled air to produce frozen carbon dioxide crystals which can then be agglomerated to form blocks of dry ice which can then be easily transported. This process eliminates the need to dig mines, use existing caverns, or to find algae deposits, or lime quarries, or build pipelines. Instead, the $CO_2$ gas is frozen into solid blocks of dry ice which can then be delivered to virtually any frozen product facility—for example those that produce carbonated beverages—which in turn allows the system to offset the high costs associated with separating the $CO_2$ as discussed.

In this respect, it should be noted that $CO_2$ can be captured and transported in gaseous, liquid and solid form—wherein the latter is called dry ice. Dry ice can be kept at a temperature of less than minus 109.3 degrees F. and transforms directly to gas when it melts (hence the name). And, when compressed, one cubic feet of dry ice equals 93.65 pounds of carbon dioxide, whereas, in gaseous form, the same amount (poundage) of $CO_2$ would take up more than 17,657.3 cubic feet. Thus, it can be seen that from a cost and efficiency standpoint it is desirable to not only compress $CO_2$ gas, but to form it into dry ice blocks, wherein the blocks can then be easily transported and stored.

Generally speaking, the present system injects the $CO_2$ gases that are emitted from a coal combustion power plant into an insulated mixing chamber, along with a predetermined amount of super chilled air, to flash freeze the carbon dioxide gas and form crystals that can then be agglomerated. By mixing the super chilled air with the $CO_2$ gas in the chamber, frozen $CO_2$ gas crystals will form in a dead zone area which causes them to float, agglomerate and fall to the bottom where they can collect. In this respect, the approach generally comprises the following steps:

1. Producing a volumetric flow of super chilled air at temperatures as low as minus 150 degrees F. to minus 180 degrees F. using a turbo compressor and turbo expander device, and introducing the chilled air into an insulated mixing chamber.
2. Producing a volumetric flow of $CO_2$ gas by separating it from coal, such as by using an existing IGCC process, wherein the $CO_2$ gas can then be introduced into the chamber and mixed with the super chilled air to cause the temperature of the $CO_2$ gas to be reduced significantly.
3. As the $CO_2$ gas begins to mix with the chilled air, and freeze, due to heat exchange, pure $CO_2$ crystals will form which then begin to agglomerate together as they float downward. Over time, i.e., less than a few seconds, the frozen $CO_2$ crystals will fall to the bottom of the chamber, wherein they begin to collect and form dry ice blocks. One of the keys is mixing an appropriate percentage of $CO_2$ gas (at room temperature) with an appropriate percentage of super chilled air which causes the mixture to reach the appropriate temperature and results in the formation of frozen crystals.
4. A screw or other device can be provided at the bottom of the chamber to push the agglomerated $CO_2$ crystals through a portal which allows the crystals to fall onto a conveyor belt with frames that can be used to form the dry ice blocks. A side duct is preferably provided in the chamber to allow the chilled air to escape such that the chilled air can be separated from the $CO_2$ gas. Thereafter, the ice blocks can readily be transported and stored, and/or sold to businesses that may need the $CO_2$ for commercial purposes, including in the carbonated beverage industry. Because these industries need to use $CO_2$ to produce their products regardless of where the $CO_2$ comes from, by using the $CO_2$ derived from coal combustion power plants, rather than fresh $CO_2$, the total consumption and release of $CO_2$ into the earth's atmosphere can be reduced thereby.

Another feature of the present invention preferably involves producing the super chilled air with a turbo compressor and turbo expander device, wherein the device can draw ambient air and compress it, and then release it, to cause the compressed air to become super chilled. There are at least two different compression methods contemplated by the present invention as follows: (1) a turbo compressor and turbo expander device having the capacity to generate super chilled air without storing the compressed air first, and (2) a compressed air energy storage system having a high pressure storage tank wherein a turbo compressor compresses the air into the tank, and a turbo expander is used to release and expand the compressed air to produce super chilled air. In either case, the chilled air is preferably injected into the mixing chamber to flash freeze the $CO_2$ gas injected into the chamber.

The present invention preferably comprises a system that can be used to introduce the $CO_2$ gas and super chilled air in the appropriate amounts and at the appropriate rates to ensure that the final temperature of the $CO_2$ gas crystals that form in the chamber will remain at or below minus 109.3 degrees F. In this respect, the $CO_2$ gas and super chilled air are preferably introduced into the chamber under sufficient pressure to cause them to mix properly and sufficiently, such that the chilled air transfers the cold temperature to the $CO_2$ gas. By injecting the super chilled air into the mixing chamber so that the $CO_2$ gas is circulated with the super chilled air, $CO_2$ gas crystals will begin to form and agglomerate. The rate and flow of each is preferably predetermined and controlled, as well as the overall size and configuration of the chamber, so that the resultant mixture quickly reaches the optimum temperature and appropriately sized crystals and properties are achieved.

The direction that the $CO_2$ gas and super chilled air are introduced into the chamber can contribute to the proper formation of the $CO_2$ crystals and therefore the agglomeration of the ice mass. In this respect, the present invention contemplates both 1) counter-flow and 2) co-flow arrangements. The factors that determine which to use depends on how quickly the $CO_2$ needs to be frozen, which is dependent on how cold the $CO_2$ gas and super chilled air need to be before they enter the chamber, as well as the size of the chamber, how much of each is introduced into the chamber, and at what rate, etc. In the counter flow embodiment, the system preferably has a chamber that injects the $CO_2$ gas downward into the chamber through multiple inlets, wherein the super chilled air is introduced upward through multiple inlets spaced around the perimeter. This is called a counter flow process because the $CO_2$ gas and super chilled air are injected in opposite directions to enhance the mixing as well as reduce the residence time of the crystals in the chamber. In the co-flow embodiment, both the $CO_2$ gas and super chilled air are introduced in the same direction, which allows for a speedier drop of crystals to the bottom and a smooth cyclonic separation of the $CO_2$ from the air.

In either case, during the downward flight of the $CO_2$ crystals through the chilled air, the crystals will get colder and agglomerate together as they fall, wherein by the time they reach the bottom, they will preferably be at the appropriate temperature. A side duct is preferably provided on the side of the chamber that allows the chilled air to escape while permitting the $CO_2$ crystals to fall or be projected down to the bottom. This helps to ensure that the crystals are separated from the chilled air, wherein the chilled air can then be transferred out and used for cooling purposes, such as to provide additional cooling for HVAC, refrigeration, desalination and/or fuel-driven generator set intake air which further increases the efficiency of the system.

The bottom of the chamber is preferably provided with a screw that helps to push the agglomerated crystals down through a portal leading to a conveyor system that helps to form the ice blocks. The conveyor preferably has frames intermittently spaced apart with a flexible belt so that as the conveyor rotates, the ice blocks will form and then be automatically released such as onto a transport vehicle.

In this respect, it has been found that it is desirable for the crystal mass at the bottom of the chamber to remain at slightly lower than the freezing temperature of $CO_2$, such that the dry ice blocks will remain frozen while the blocks are being deployed. Accordingly, it is desirable to control the temperature of the chilled air inside the chamber as well as the temperature of the $CO_2$ gas, and the rate of introduction of each, to obtain the optimum results. The minus 109 degree F. sublimation temperature is so cold that one also needs to consider the need for the downstream chilled air after the formation of the blocks of dry ice such that the downstream chilled air contributes strongly to the overall final system efficiency.

In connection with a related feature, increased efficiency is achieved by recycling the heat and energy generated by the turbo compressor and turbo expander device and producing additional energy in the form of electricity and/or additional cool air for HVAC, refrigeration and desalination. This allows for more cost savings to be achieved which can further offset the high cost of separating the $CO_2$ gas from the coal, i.e., the energy can be used to power the IGCC.

In this respect, the present invention preferably incorporates the method and system described in related U.S. Provisional Application Ser. No. 61/195,418, entitled "Method and Apparatus for Using Compressed Air to Increase the Efficiency of a Fuel Driven Turbine Generator." That system relates to an improved method and system for increasing the efficiency of a fuel driven turbine generator, wherein the system preferably uses super chilled air from a turbo compressor and turbo expander device and mixes it with ambient air to produce cool air that can be injected into the compressor turbine for more efficient operation thereof. Unlike previous devices for cooling the inlet air, the system utilizes compressed air expanded by a turbo compressor and turbo expander device to generate the super chilled air; wherein the system produces not only cool air that can be drawn into the fuel driven generator, but "dry" inlet air. And, by removing the moisture from the inlet air using a centrifuge, when the inlet air is accelerated through the nacelle and into the compressor turbine, no ice particles that could damage the turbine blades are formed.

Whether the device is a CTT device (Compressor/Turbo Compressor/Turbo Expander), or a TCAES device (Turbo Compressed Air Energy System), as will be defined later, a combination turbo compressor and turbo expander device that compresses air under pressure and then releases it to produce super chilled air is contemplated. The device preferably releases compressed air, or has a first compressor that at startup compresses and drives the air, to cause the turbo expander to begin rotating, and then, because the turbo expander and turbo compressor are located on a common shaft, rotating the turbo expander causes the turbo compressor to rotate as well. This occurs until, after a few seconds, a steady state condition of operation is achieved, wherein the turbo compressor continues to compress the air, and the turbo expander continues to expand the air, and the end result is that a high mass flow of super chilled air is produced as a by-product.

The super chilled air produced by the device is then mixed with ambient air to produce a relatively cool inlet air for introduction into the compressor turbine of the fuel-driven turbine generator. A mixing compartment or eductor is preferably provided in which the chilled air is mixed. As the two air masses are mixed together, what emerges is a relatively cool mass flow of air that can be used as the inlet air to increase the efficiency of the fuel driven turbine generator.

As discussed above, an advantage of producing cool air and using it as the inlet air in the compressor turbine is that the air becomes denser, and has greater mass flow, and therefore, the compressor turbine doesn't have to work as hard to compress an equivalent volume of inlet air into the combustion chamber. Accordingly, the compressor turbine ends up consuming less energy, wherein more energy then becomes available to drive the electric generator, i.e., a greater portion of the energy produced by the system is used to drive the electric generator and produce electricity. What results is that less energy is used to operate the compressor turbine, which advantageously means that more energy is available to drive the electric generator, which helps to increase the ability of the system to produce more energy per unit volume of fuel consumed.

Another advantage of the device is that the super chilled air can be used to remove the moisture from the inlet air and avoid the creation of ice particles that can damage the turbine blades. This is accomplished by using the super chilled air as a means of flash freezing the water vapor within the ambient air and then separating the ice particles (including the solid particulates trapped within the ice particles) from the chilled air. That is, as the warm moist ambient air is mixed with the super chilled air, most of the water vapor that exists within the ambient air is flash frozen to form tiny ice particles. Then, as the ice particles fall to the bottom of a separation compartment (or centrifuge), the cool dry air can be directed into a side duct or passageway that extends at about ninety degrees relative to the axis of the centrifuge, wherein as the high speed ice particles continue on their straight inertial trajectory to the bottom, the cool dry air can then turn the corner and pass through the passageway and leave the ice particles behind. The result is that cool "dry" air is produced.

As discussed, the elimination of ice particles from the cool inlet air not only increases the efficiency of the system but also avoids pitting and causing damage to the turbine blades and allows the inlet air to be provided at even lower temperatures. The entrance into the compressor turbine of the fuel driven turbine generator is typically in the shape of a nozzle or nacelle, with a relatively wide opening followed by a relatively narrow nacelle, where the compressor turbine blades are located. Accordingly, as the inlet air is accelerated through the nacelle, an approximately adiabatic acceleration of the drawn-in air results from a constriction of the flow path, wherein this condition is associated with an enthalpy reduction, which in turn, produces a significant temperature drop. Although lower inlet air temperatures result in greater system efficiencies, the downside is that if the temperature of the inlet air is reduced to below freezing, ice particles can form that can strike the turbine blades and cause damage thereto.

In another embodiment, the chilled water produced as the ice particles melt in the centrifuge are used to provide cooling for ancillary devices. That is, as the ice particles are collected at the bottom of the centrifuge, they can be thawed to produce chilled water that can be transferred to an associated device such as a thermal energy storage system wherein the chilled water can be stored for later use. The thermal energy storage system preferably comprises a stratification tank in which the chilled water can be stored, and from which the chilled water can be removed to provide cooling for ancillary devices, such as HVAC, refrigeration, desalination or the like, etc. After the chilled water is used to provide the necessary cooling for these devices, the water is then recycled back into the stratification tank, wherein by storing the chilled water in this fashion, water can be made available when it is needed—on demand. In an alternate embodiment, the chilled water can be used directly to provide cooling for HVAC, refrigeration, desalination or the like, etc., without storing it first.

Heat exchangers are also used to draw heat produced by air compression away and transferred to a steam turbine generator system and/or chiller system associated therewith to enhance the performance thereof. The heat exchangers preferably comprise a coolant, such as water, that can be channeled through the compressor units to transfer heat from the device to an associated steam turbine generator device and/or chiller system. In connection with the steam generator, pre-heated water can be made available for the associated boiler so that the water in the boiler can be brought to boiling using less energy. By withdrawing the heat from the device, and preheating the coolant water, and introducing the coolant water into the boiler, not only is the steam turbine generator made more efficient, but the entire system can be made more efficient in producing electricity. The steam driven turbine generator can be any conventional type that uses a boiler to create steam, which in turn, drives a steam turbine wherein an electrical generator can be driven to produce electricity.

DESCRIPTION OF THE DRAWINGS

FIG. 9 is a chart showing the thermodynamic states for an example of the CTT device;

FIG. 10 is a chart showing the heat balance and air flow requirements for an example of the CTT device;

FIG. 11 is a chart showing the $CO_2$ and air duct sizes from the power plant for an example of the present system;

FIG. 12 is a chart showing the $CO_2$ and air duct sizes for the mixing duct for an example of the present system;

FIG. 13 is a chart showing the efficiency of the compressor for an example of the CTT device; and FIG. 14 is a chart showing the thermodynamic properties of two different CTT devices.

DETAILED DESCRIPTION OF THE INVENTION

The utilization of coal in present technologies produces some undesirable emissions. These include oxides of nitrogen and sulfur, particulate emissions and greenhouse gases such as carbon dioxide. There are strong incentives to reduce these emissions and improve fuel efficiency of coal utilization technologies.

Figure 1A:
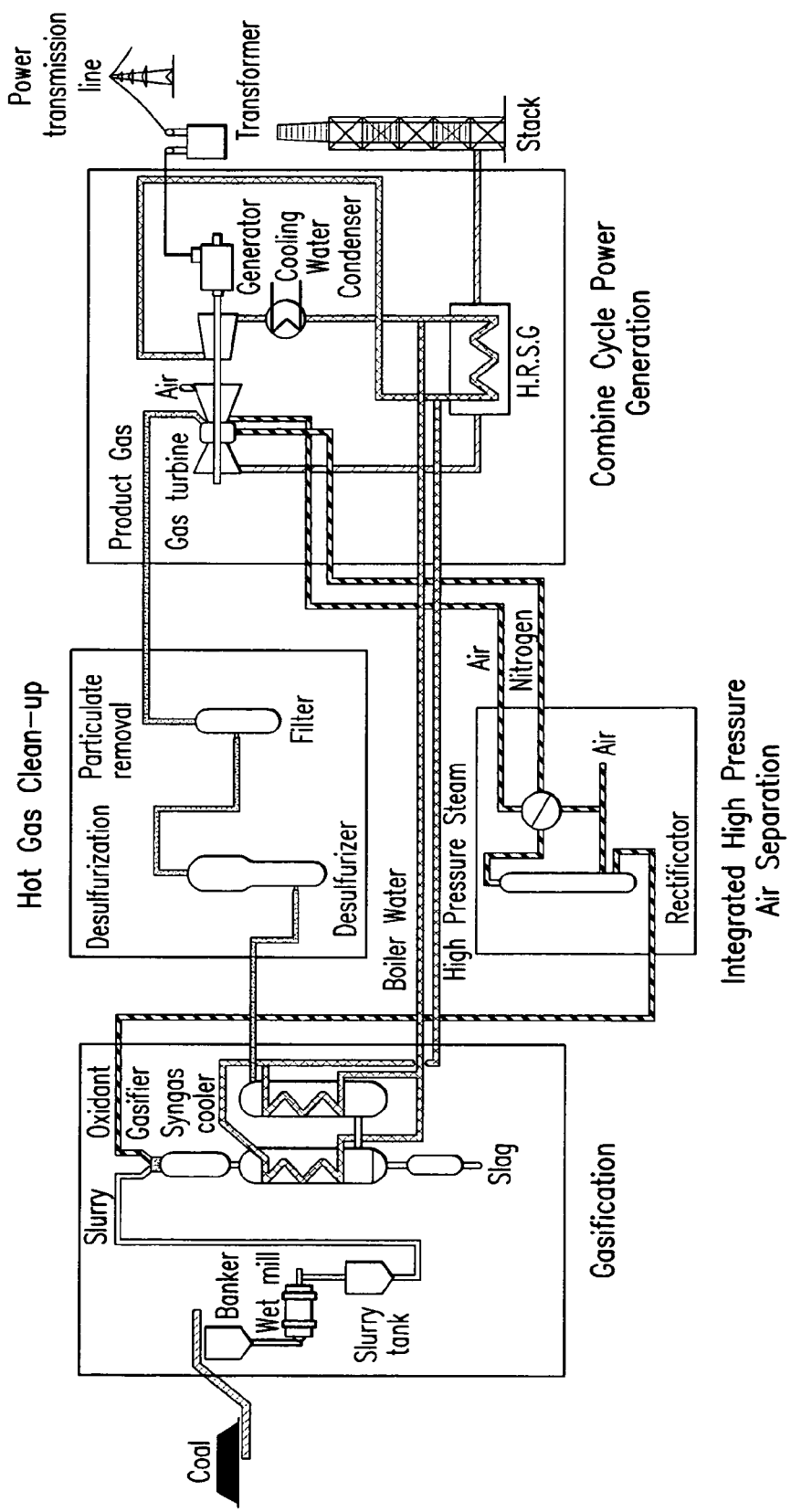
FIG. 1A is a schematic drawing showing various components and steps of an existing IGCC system for cleaning and separating CO and $CO_2$ gases from flue gases released from coal combustion power plants (HRSG=Heat Recovery Steam Generator)

To address these challenges, new coal utilization technologies are being developed. One of the more promising of these is the Integrated Gasification Combined Cycle technology ("IGCC") used in power generation. FIG. 1A shows a schematic flow diagram of a typical existing IGCC system 1. This system 1 is used by coal-combustion power plants and its emission-scrubbing system for the purpose of cleaning and separating CO and $CO_2$ gases from the other flue gases produced by the power plant. Other processes such as sub-critical pulverized coal (SPC), ultra-supercritical pulverized coal (USCPC), and circulating fluidized bed (CFB), among others, can also be used, but the IGCC process is presented herein as the preferred system.

IGCC is believed to be the type of system that will predominately be used in the future to add to the electrical power supply, and replace aging coal power plants and increasingly expensive natural gas power plants. The process offers options to eliminate greenhouse gases and produce useful hydrogen and/or liquid fuels.

The process used by IGCC plants can be broken down into two general technologies: The first technology is called coal gasification wherein coal is gasified to produce a synthetic gas (syngas). The second technology is called combined-cycle power generation which is one of the most efficient methods of commercially producing electricity available today. After pollutants are removed from the syngas, electricity is generated using the following process: 1) a gas turbine-generator is used to burn the syngas, 2) heat from the gasification and the exhaust heat from the gas turbine generator are used to create steam, and 3) steam is used to power a steam turbine-generator which helps generate electricity.

Coal gasification is a process that produces a clean coal gas (syngas) that can be used as the fuel for the gas combustion turbine. In this process, before the coal is combusted, coal is reacted with steam and air or oxygen under high temperatures and pressures to produce a gaseous fuel which mainly consists of hydrogen and carbon monoxide. The amount of air or oxygen ($O_2$) available inside the gasifier is preferably carefully controlled so that only a portion of the fuel burns completely. This "partial oxidation" process provides the heat necessary to chemically decompose the fuel and produce the synthesis gas (syngas), which is composed of hydrogen ($H_2$), carbon monoxide (CO), and minor amounts of other gaseous constituents.

The syngas is then processed in a water-gas-shift reactor, which preferably converts the CO to $CO_2$ and increases the $CO_2$ and $H_2$ molecular concentrations, such as to 40 percent and 55 percent, respectively, in the syngas stream. The carbon monoxide and high pressure water vapor in the presence of a catalyst then forms $CO_2$ and more $H_2$, which in practice, results in a fuel gas which can contain over 90% hydrogen. It also results in the carbon compounds being reacted to form carbon dioxide, which can then be easily removed, since the gas mixture is at a high pressure and the $CO_2$ is at a high concentration. Because $CO_2$ is present at much higher concentrations in syngas than in post-combustion flue gas, $CO_2$ capture is less expensive using pre-combustion techniques than post-combustion capture methods. Currently there are few gasification plants in full-scale operation, and the capital costs involved are higher than for conventional pulverized coal plants.

The syngas produced by the IGCC technology is preferably cleaned by a gas cleanup process—the $CO_2$ can be washed out of the hydrogen rich fuel gas using various solvents—and in one such application, the solvent used is MDEA. Instead of solvents, membranes can also be used for $CO_2$ separation and hydrogen purification using at least two approaches: 1) Water Gas Shift (WGS) membrane reactor, and 2) $CO_2$ removal followed by WGS reaction. In the first approach, i.e., WGS membrane reactor, the membrane removes $CO_2$, and the commercial $Cu/ZnO/Al_2O_3$ catalyst at 130 degrees C. to 160 degrees C. and shifts CO to $H_2$ so that it catalyzes the WGS reaction. By removing $CO_2$ simultaneously, the reversible WGS is shifted forward so that CO is converted to hydrogen and the CO concentration is then reduced significantly. A CO concentration of less than 10 ppm and a $H_2$ concentration of greater than 50% (on the dry basis) can be achieved at various feed gas flow rates. In the second approach, the process consists of a $CO_2$ selective membrane module followed by a conventional WGS reactor. The $CO_2$ selective membrane module removes more than 99% of the $CO_2$ in the syngas.

In the Combined Cycle Gas Turbine process ("CCGT"), the syngas is burned to produce electricity. As shown in FIG. 1A, the design of the CCGT power generator consists of a combustion turbine/generator, a heat recovery steam generator (H.R.S.G.), and a steam turbine/generator. The heat from the gasifier and exhaust heat from the combustion turbine are preferably recovered in the heat recovery steam generator to produce steam. This steam then passes through a steam turbine to power another generator which produces electricity. The CCGT is more efficient than conventional power generating systems because it re-uses the waste heat from the system to produce more electricity.

IGCC is a technology that comprises the following characteristics:

SOx, NOx and particulate emissions are much lower in IGCC plants than from a modern coal plant. Its volatile organic compounds (VOC) emissions and mercury emissions are comparable.

IGCC plants emit approximately 20% less $CO_2$ gas than a modern coal plant.

IGCC plants use 20-40% less water than a modern coal plant.

IGCC plants operate at higher efficiencies than conventional coal fired power plants thus requiring less fuel and producing less emissions. Current efficiency is 42% with efficiencies as high as 60% expected in the very near future using high efficiency turbines and some other process improvements.

Costs for electricity, without $CO_2$ capture, is about 20% higher than in a modern coal plant. Electricity costs are 40% lower than from a natural gas IGCC plant with natural gas at $6.50 per MMBTU.

$CO_2$ from an IGCC plant is captured much more easily than from a conventional coal combustion plant at an additional cost increase of 25-30% for capture and sequestration, without transportation charges.

IGCC captures the hydrogen that is part of the syngas stream in an economic manner.

The advantages of IGCC over current conventional coal-based power generation systems include:

1) Higher efficiencies and lower emissions: Improvements in efficiency dramatically reduce emissions from coal combustion. For example, increasing efficiency from 35% to 40% reduces carbon dioxide gas emissions by over 10%. With efficiencies currently approaching 50%, IGCC power plants use less coal and produce lower emissions of carbon dioxide than conventional power plants. With the development of new gas turbine concepts and increased process temperatures, efficiencies of more than 60% are being targeted.

2) Higher output: Using syngas in a gas turbine increases its output, especially when nitrogen from an oxygen blown unit is fed to the turbine. Thus a turbine rated at 170 MW when fired on natural gas can yield 190 MW or more on syngas. Furthermore, output is less dependent on ambient temperature than is the case with natural gas.

3) Product flexibility—including carbon capture and hydrogen production: The gasification process in IGCC enables the production of not only electricity but a range of chemicals, by-products for industrial use, and transport fuels. Moreover, and most importantly, carbon dioxide can be captured from coal syngas (carbon monoxide and hydrogen) through a water/gas shift process. That is, $CO_2$ can be captured in a concentrated stream thereby making it easier to sequester. An added advantage is that there are low additional costs for carbon capture, particularly if the plant is oxygen driven.

Figure 1B:
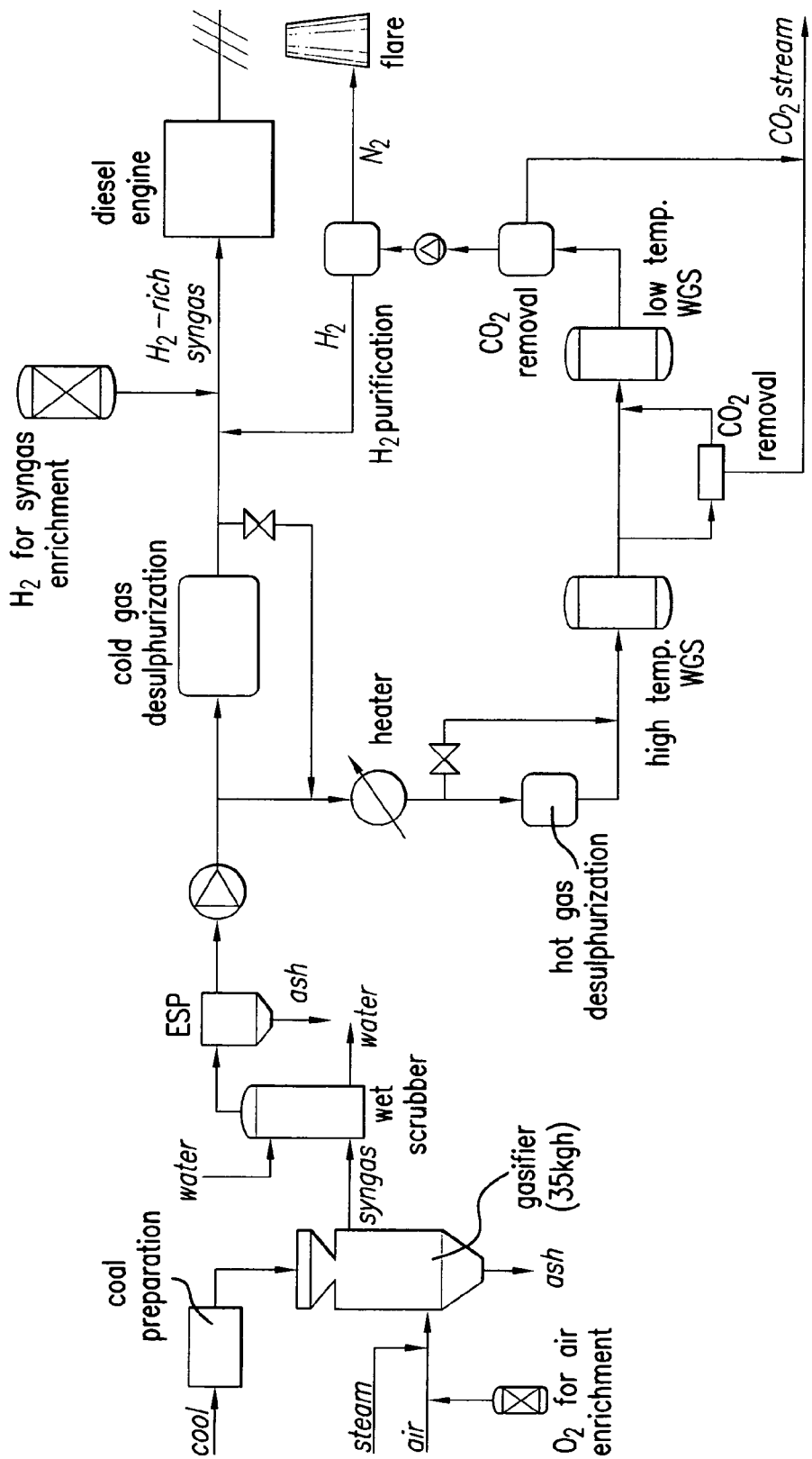
FIG. 1B is a schematic diagram showing an existing system for processing coal and removing the carbon dioxide therefrom (WGS reactor=Water Gas Shift reactor; ESP=Electrostatic Precipitator)

A related existing technology is shown in FIG. 1B, which shows the conceptual integrated lab scale power plant scheme, with the syngas coming out from the gassifier being subjected to a gas cleaning section consisting of a scrubber and an electrostatic precipitator (ESP). The sygnas is split in two streams: The first stream consists of 80% of the total gas flow which is sent to a power production line which is made up of: 1) a cold desulphurization system, and 2) an internal combustion engine for power production. The second stream consists of 20% of the total flow which is sent to a hydrogen production line which is made up of: 1) a hot desulphurization system, 2) two water gas shift sections (high and low temperatures), 3) two $CO_2$ separation stages to obtain an enriched hydrogen gas stream, and 4) a hydrogen purification system.

In this process, the CO in the flue gas is converted to $CO_2$ and $H_2$ by interaction with water. Thus the $CO_2$ in the flue gas is increased in concentration. This stream of $CO_2$ is then separated by the next process: Gas from the shift conversion undergoes further processing for the separation of carbon dioxide from hydrogen. Chemical processes, based on absorption with amines, are employed to remove carbon dioxide from the gas stream containing hydrogen using a reactor with hydrophilic and hydrophobic polymeric membranes. The process includes the following sections: 1) Syngas diffusion into the amine solution through hydrophilic membrane, 2) $CO_2$ absorption into the amine solution, and 3) Purified syngas separation through hydrophobic membrane.

Although the current IGCC power plant is the preferred approach that has been selected for use with the present invention, there are three key disadvantages found in existing IGCC plants: (1) excess power losses, (2) high cost of transporting $CO_2$, and (3) high cost of sequestering $CO_2$. Nevertheless, the intent of the present system is to reduce and in some configurations eliminate the power losses, as well as the need for transportation by expensive pipelines, and the need for sequestering.

The stream of carbon dioxide gas that is generated by the coal-combustion power plant and its emission-scrubbing operation was in the past disposed of by releasing it through smokestacks into the atmosphere, thus contributing significantly to the greenhouse gases in the atmosphere. Attempts have also been made to transport and sequester the $CO_2$ emissions using expensive pipelines and compression equipment, although none of these efforts have been very successful.

The present invention comprises a system that represents an improvement over past attempts to separate, transport and sequester the $CO_2$ gas emissions emanating from coal combustion power plants, and preferably uses super chilled air which can be mixed with $CO_2$ gas to form crystals that can agglomerate to form dry ice blocks that can easily be transported and stored, and/or used for commercial purposes, such as for the production of carbonated beverages. The following is a list of commercial applications for $CO_2$: drinks, foods, pneumatic systems, fire extinguishers, welding, caffeine removal, pharmaceutical and other chemical processing, biological applications, lasers, polymers and plastics, oil recovery, as refrigerants, coal bed methane (CBM) recovery and wine making. The solid carbon dioxide ice blocks can be transferred from the coal combustion power plant and shipped offsite to be used elsewhere, and as a result, there are no remaining carbon dioxide footprints at the site.

The present invention can use virtually any system for separating carbon monoxide and carbon dioxide from the coal and/or carbon burning flue gases and for combining these two gasses to form one stream of carbon dioxide gas, but preferably, it uses the IGCC system described above. The basic operation of the present system comprises the following steps:

1) COMPRESSION: The system uses one or more turbo compressors to compress and raise the pressure of ambient air;

2) COOLANT: The system exposes the compressed air to a coolant so that the temperature of the compressed air can remain at or near room temperature, wherein the heated coolant water can then be used to increase the efficiency of an associated steam turbine generator or chiller, wherein the energy can then be used to help drive the IGCC;

3) EXPANSION: The system releases and expands the compressed air through one or more turbo expanders thereby generating super chilled air as a by-product;

4) MIXING: The system mixes the super-chilled air generated by the turbo expander(s), which can be as low as minus 150 degrees F. to minus 180 degrees F., with a flow of carbon dioxide gas from the IGCC system. Preferably, the ratio of mass of the warm carbon dioxide gas to the super-chilled air will result in the carbon dioxide gas being reduced in temperature to at least minus 109.3 degrees F. or less, which results in the freezing and solidification of the $CO_2$ gas. The result is solid carbon dioxide (dry ice) blocks that can easily be transported and stored, and cold air that can be used elsewhere for HVAC, refrigeration and/or desalination. The left-over chilled air can also be used to provide cool inlet air for an associated fuel driven turbine generator to increase the efficiency thereof, wherein the energy derived therefrom can also be used to help drive the IGCC.

Figure 2:
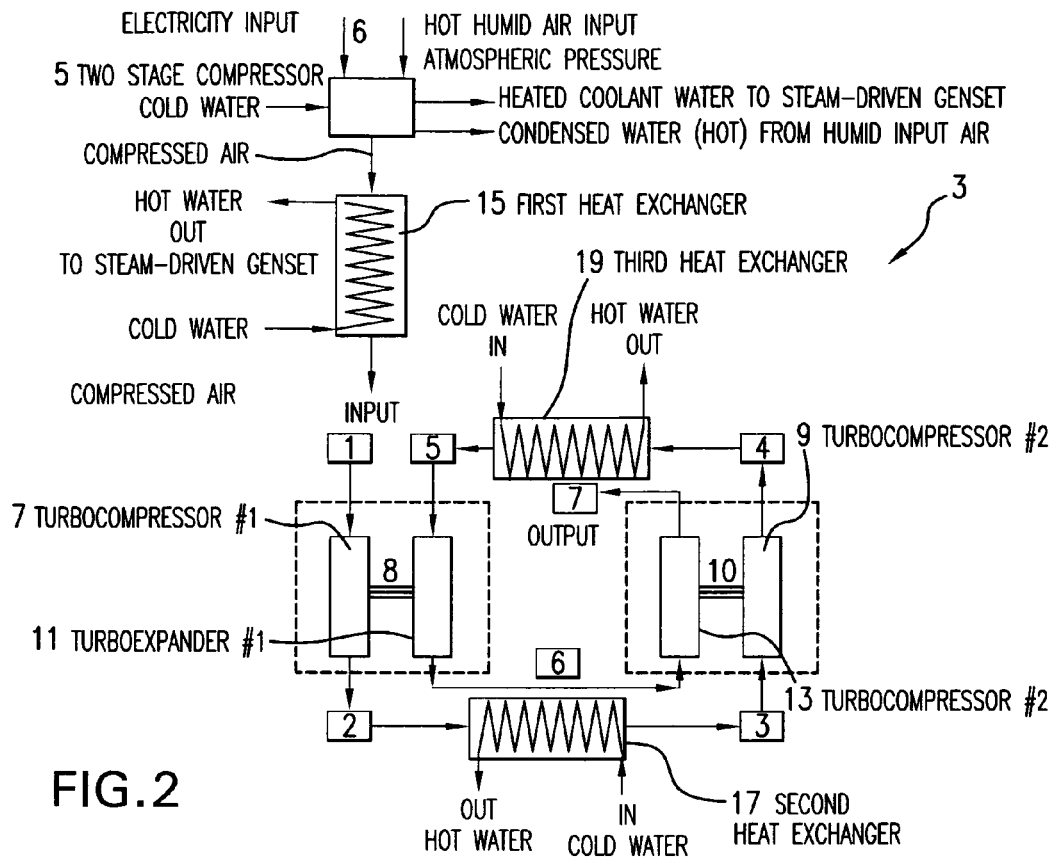
FIG. 2 is a schematic drawing showing an embodiment of the CTT device used to generate super chilled air that utilizes a two stage turbo compressor and two stage turbo expander set with a two stage compressor, wherein the turbo compressor and, turbo expander sets are located on a common shaft, and multiple heat exchangers for removing heat from the compressors are provided.
Figure 3:
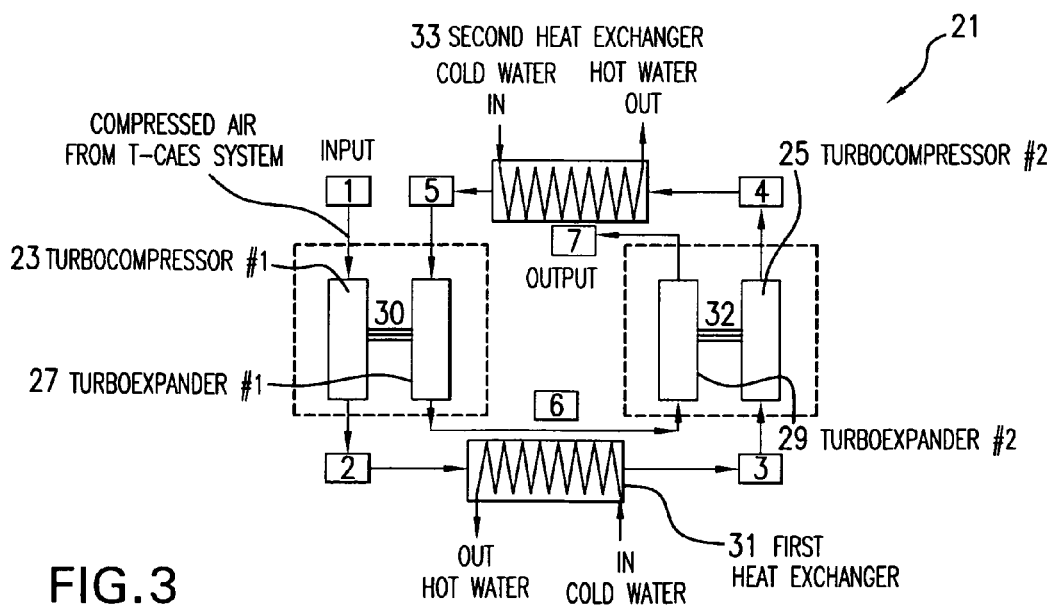
FIG. 3 is a schematic drawing showing an embodiment of the TCAES system used to generate super chilled air that incorporates a storage tank, and utilizes a two stage turbo compressor and two stage turbo expander set, wherein the turbo compressor and turbo expander sets are located on a common shaft, and multiple heat exchangers for removing heat from the compressors are provided.

Although the above cooling and freezing steps can readily be accomplished by any conventional cooling and/or refrigeration system, the present invention preferably uses a turbo compressor and turbo expander device with a free spooling arrangement, such as those shown in FIGS. 2 and 3, which permit higher mass flow rates of air with higher compression of air whereby final expansion to atmospheric pressure can produce super chilled air. Furthermore, the footprint and volume of the hardware are small compared to conventional refrigeration machinery. Turbo machinery, in particular, can be essential to the success of any cryogenic process. An example of the type that can be used is produced by CryoMachinery (Air Products) which is a radial inflow turbo expander that provides refrigeration for some of the most efficient air separation and liquefaction facilities in the world today. High-pressure turbo expanders are typically used to provide refrigeration for the production of cryogenic liquids; the expander extracts work from a high-pressure gas stream providing refrigeration to the process. The work removed from the gas stream by the expander is used to provide power to the compression cycle.

FIG. 2 shows a two stage turbo expander CTT device 3 that has a two stage compressor 5, a two stage turbo compressor 7, 9, and a two stage turbo expander 11, 13, along with first, second and third heat exchangers, 15, 17 and 19. The operation of CTT device 3 preferably begins with two stage compressor 5 initially pressurizing the ambient air using a small amount of energy from the coal combustion power plant, i.e., a minimal amount of power 6 is tapped from the coal-combustion power plant to drive compressor 5. Nevertheless, as will be discussed, this energy can be reduced as the waste heat from the system is recovered and used in a co-located steam-fired generator set or co-located chiller. A separate power source can also be employed.

Figure 5:
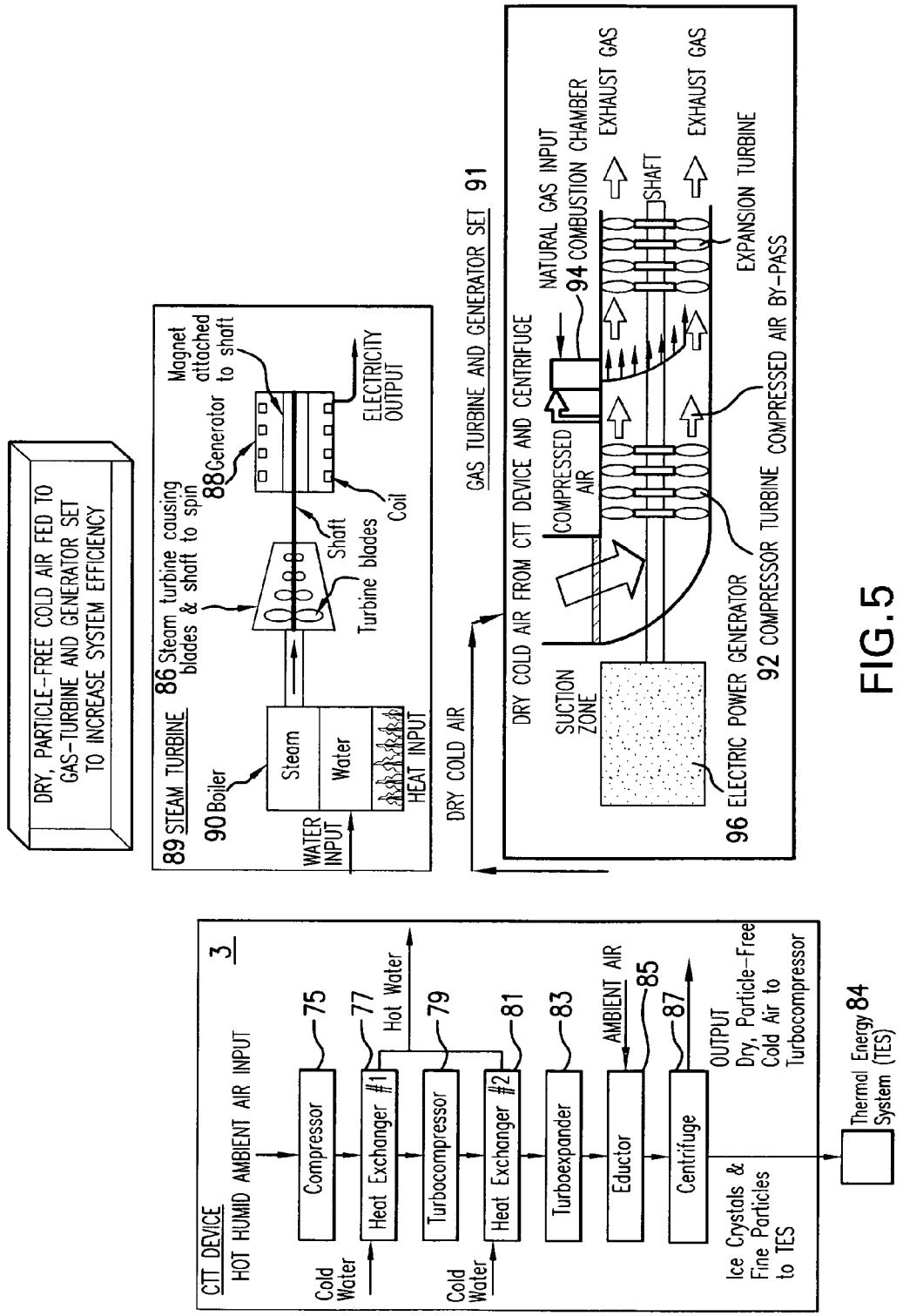
FIG. 5 is a schematic drawing of the CTT device showing the various components and method steps for increasing the efficiency of a fuel driven turbine generator, including the steam turbine generator.

Compressor 5 preferably comprises a coolant system of its own that helps to reduce the temperature of the compressed air as it is being pressurized, wherein cold water (such as at 60 degree F.) can be distributed through the compressor and used as the coolant, wherein the heated water can then be distributed to an associated steam driven generator set 89, such as shown in FIG. 5, to produce additional electricity or can be fed to a chiller.

First heat exchanger 15 can be provided downstream from compressor 5 as shown in FIG. 2. Additional cold water (such as at 60 degrees F.) can be distributed through first heat exchanger 15 to reduce the temperature of the compressed air, such as down to room temperature, which helps to ensure that the eventual chilled air used by the system is substantially cooled. The heated coolant water can then be distributed to associated steam driven generator set 89, and used to produce additional electricity, again, as shown in FIG. 5.

The compressed air from compressor 5 that passes through first heat exchanger 15 is then preferably introduced into first stage turbo compressor 7, where the compressed air is compressed and heated again. First turbo compressor 7 preferably takes the compressed air from compressor 5 and compresses it further to increase the pressure, but thereafter, because additional heat will also be generated, the heated and compressed air is passed through second heat exchanger 17 which reduces the temperature of the compressed air again, using substantially the same coolant system described above in connection with first heat exchanger 15, wherein cold water can be used as the coolant and the heated water can then be used in an associated steam generator set 89, to produce more energy as shown in FIG. 5.

The compressed air that has been cooled is then passed into second turbo compressor 9 wherein the compressed air is compressed and heated again. The heated and compressed air is then passed through third heat exchanger 19 which reduces the temperature of the air again, using substantially the same coolant system described above in connection with first and second heat exchangers 15 and 17, wherein the heated water can then be used in an associated steam generator set 89, to produce more energy as shown in FIG. 5.

Once the compressed air is fully pressurized, such as up to 215 psia, and cooled, such as down to about room temperature, the compressed air is then released and expanded by first and second turbo expanders 11, 13 (see FIG. 2), which release the compressed air to produce super chilled air. In this respect, it should be noted that as compressor 5 is fired up and works to compress the ambient air, and air is passed through the system, because first turbo compressor 7 and first turbo expander 11 are located on a common shaft 8, and because second turbo compressor 9 and second turbo expander 13 are located on a common shaft 10, the rotation of the two turbo expanders will cause the two turbo compressors to rotate as well, until a steady state (spooling) condition of operation is achieved. Each set of spooling impellers are independently situated and therefore can have their own rotational speeds.

The basic operation of device 3 therefore starts with compressed air being generated by compressor 5 and then being introduced into first stage turbo compressor 7, and then into second stage turbo compressor 9, and by the time the compressed air is released and expanded by turbo expanders 11, 13, because first turbo expander 11 is located on the same shaft as first turbo compressor 7, and second turbo expander 13 is located on the same shaft as second turbo compressor 9, when first and second turbo expanders 11, 13 begin to rotate, first and second turbo compressors 7, 9 will also begin to rotate. All four components—first and second turbo compressors 7, 9, and first and second turbo expanders 11, 13—will begin rotating as a result of the torque (mechanical work) generated by first and second turbo expanders 11, 13, to drive first and second turbo compressors 7, 9, respectively. In this respect, the rotational speed of shafts 8 and 10 produced by first and second turbo expanders 11, 13, respectively, preferably provides sufficient power to drive first and second turbo compressors 7, 9, respectively, until they reach an equilibrium input pressure. When the steady state condition of operation is achieved—which can occur within a few seconds—turbo compressors 7, 9 continue to compress the air, and thereafter, the compressed air continues to be released and expanded by turbo expanders 11, 13, which produces super chilled air. Each set of turbo compressor and turbo expander devices has its own rotational speed and power rating.

Preferably, heat exchangers 15, 17 and 19 help to reduce the temperature of the compressed air as the compressed air is being pressurized by compressor 5 and turbo compressors 7, 9, respectively. This way, the heat generated by the compressors can be expelled so that the heat does not affect or offset the temperature of the chilled air being generated thereby. In this respect, heat exchangers 15, 17 and 19 are preferably any conventional type such as a counter flow system that uses a coolant, such as cold water, to draw heat away from the compressors (and the compressed air that they produce), wherein once heat is exchanged, the coolant is transferred to an associated generator such as a steam turbine generator and/or absorption chiller. The heat exchangers preferably force the high temperature compressed air produced by the compressors to surrender the heat contained therein to the coolant, wherein as the coolant is heated, the temperature of the compressed air produced by the compressors can be substantially reduced.

In a counter flow heat exchanger, the cold coolant water is preferably introduced into the heat exchanger on the same end as the cooled air exits, while at the same time, the heated air is introduced into the heat exchanger on the same end as the heated water exits. That is, coolant water is introduced into one end, and heated air is introduced into the opposite end, and the coolant water and heated air are allowed to pass through the heat exchanger in opposite directions. This way, the heated air can be introduced into the same end where the heated water exits, and the cold water can be introduced into the same end where the cool air exits, thereby helping the heat exchangers to operate more efficiently.

The CTT device 3 generally comprises the following features: 1) The expansion process in the downstream turbo expander produces "work" that is transmitted through the shaft attached to the upstream turbo compressor so that they both have the same rotational speed during acceleration and when the final equilibrium rotational speed is achieved. When steady state equilibrium is reached, the turbo expander and turbo compressor, on the same shaft, achieve the same rotational speed, wherein this equilibrium state is called the "free spooling" mode. The turbo compressor in such case allows higher pressures to be achieved so that the overall expansion to atmospheric pressure can be increased. 2) The hot air generated by the compression of the turbo compressor is cooled by coolant water so that the intake to the turbo expander can be reduced such as to about room temperature. Thus, when the expansion occurs from the steep pressure drop, air temperatures in the range of minus 150 degrees F. to minus 180 degrees F. can be achieved. 3) The turbo compressor and turbo expander rotate at very high rotational speeds, on the order of 30,000 to 70,000 RPM, so that huge air mass flows are processed when huge temperature drops occur. 4) The high rotational speeds require that the impeller wheels are measured to avoid supersonic tip speeds at the circumference of the impeller. Thus these devices are preferably small, especially when compared to the mammoth conventional refrigeration and conventional chiller systems.

Figure 6:
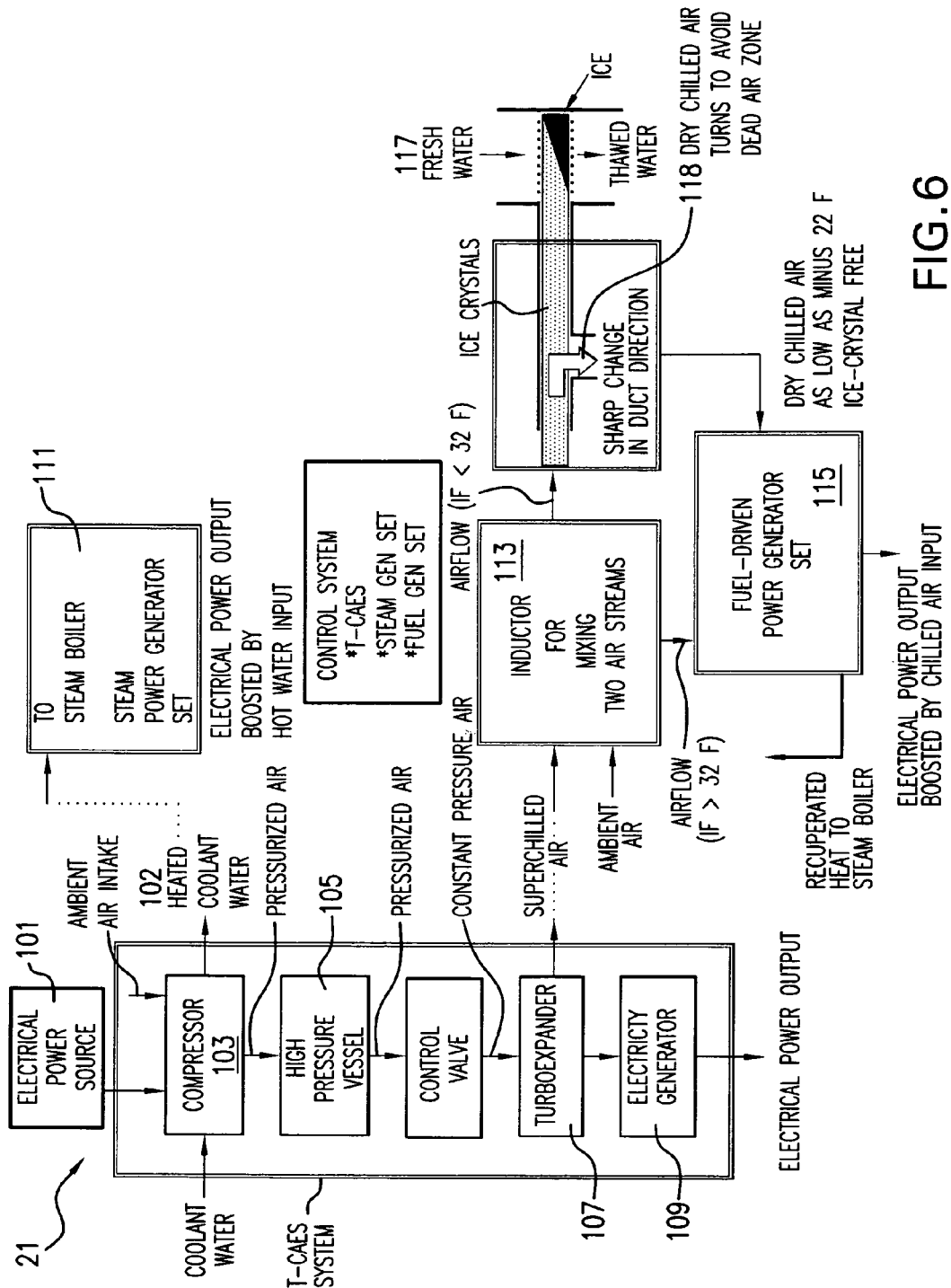
FIG. 6 is a schematic drawing of the TCAES device showing the various components and method steps for increasing the efficiency of a fuel driven turbine generator, including the steam turbine generator.

FIG. 3 shows a two stage turbo expander TCAES device 21 that has a two stage turbo compressor 23, 25, and a two stage turbo expander 27, 29, along with first and second heat exchangers, 31 and 33. The operation of TCAES device 21 is similar to CTT device 3, except that the compressed air is stored in a high pressure tank 105, as shown in FIG. 6, and can be released at any time, which provides the added benefit of acting as a time-shifting means, i.e., when the energy is produced can be different from when it is used. The compressed air from tank 105 is preferably introduced into first stage turbo compressor 23, where the compressed air is compressed and heated again. First turbo compressor 23 preferably takes the compressed air from tank 105 and compresses it further to increase the pressure further. Thereafter, because additional heat will also be generated, the heated and compressed air is preferably passed through first heat exchanger 31 which reduces the temperature of the compressed air, using substantially the same coolant system described above in connection with CTT device 3, wherein cold water can be used as the coolant, and wherein the heated water can be used in an associated steam generator set 111 to produce more energy.

The compressed air that has been cooled is then passed into second turbo compressor 25 wherein the compressed air is compressed and heated again. The heated and compressed air is then passed through second heat exchanger 33 which reduces the temperature of the air again, using substantially the same coolant system described above in connection with first heat exchanger 31, wherein the heated water can then be used in an associated steam generator set 111, as shown in FIG. 6, to produce more energy.

Once the compressed air is fully pressurized, such as up to 215 psia, and cooled, such as down to about room temperature, the compressed air is preferably released and expanded by first and second turbo expanders 27 and 29, which release and expand the compressed air to produce super chilled air. In this respect, it should be noted that as compressed is fed into first turbo compressor 23, because first turbo compressor 23 and first turbo expander 27 are located on a common shaft 30, and because second turbo compressor 25 and second turbo expander 29 are located on a common shaft 32, the rotation of the two turbo expanders will cause the two turbo compressors to rotate as well, until a steady state condition of operation is achieved.

The basic operation of device 21 starts with compressed air being introduced into first stage turbo compressor 23, and then into second stage turbo compressor 25, and by the time the compressed air is released and expanded by turbo expanders 27, 29, because first turbo expander 27 is located on the same shaft as first turbo compressor 23, and second turbo expander 29 is located on the same shaft as second turbo compressor 25, when first and second turbo expanders 27, 29 begin to rotate, first and second turbo compressors 23, 25 will also begin to rotate. All four components—first and second turbo compressors 23, 25, and first and second turbo expanders 27, 29—will begin rotating as a result of the torque (mechanical work) generated by first and second turbo expanders 27, 29, which help to drive first and second turbo compressors 23, 25, respectively. The rotational speed of shafts 30, 32 preferably provides sufficient power to drive first and second turbo compressors 23, 25, respectively, until they reach an equilibrium input pressure. When the steady state condition of operation is achieved—which can occur within a few seconds—turbo compressors 23, 25 continue to compress the air, and thereafter, the compressed air continues to be released by turbo expanders 27, 29, which produces super chilled air.

Preferably, heat exchangers 31, 33 help to reduce the temperature of the compressed air as the compressed air is being pressurized by turbo compressors 23, 25, respectively. This way, the heat generated by the compressors can be expelled so that the heat does not affect or offset the temperature of the chilled air being generated thereby. In this respect, heat exchangers 31, 33 are preferably any conventional type such as a counter flow or co-flow type, as discussed above.

Figure 4:
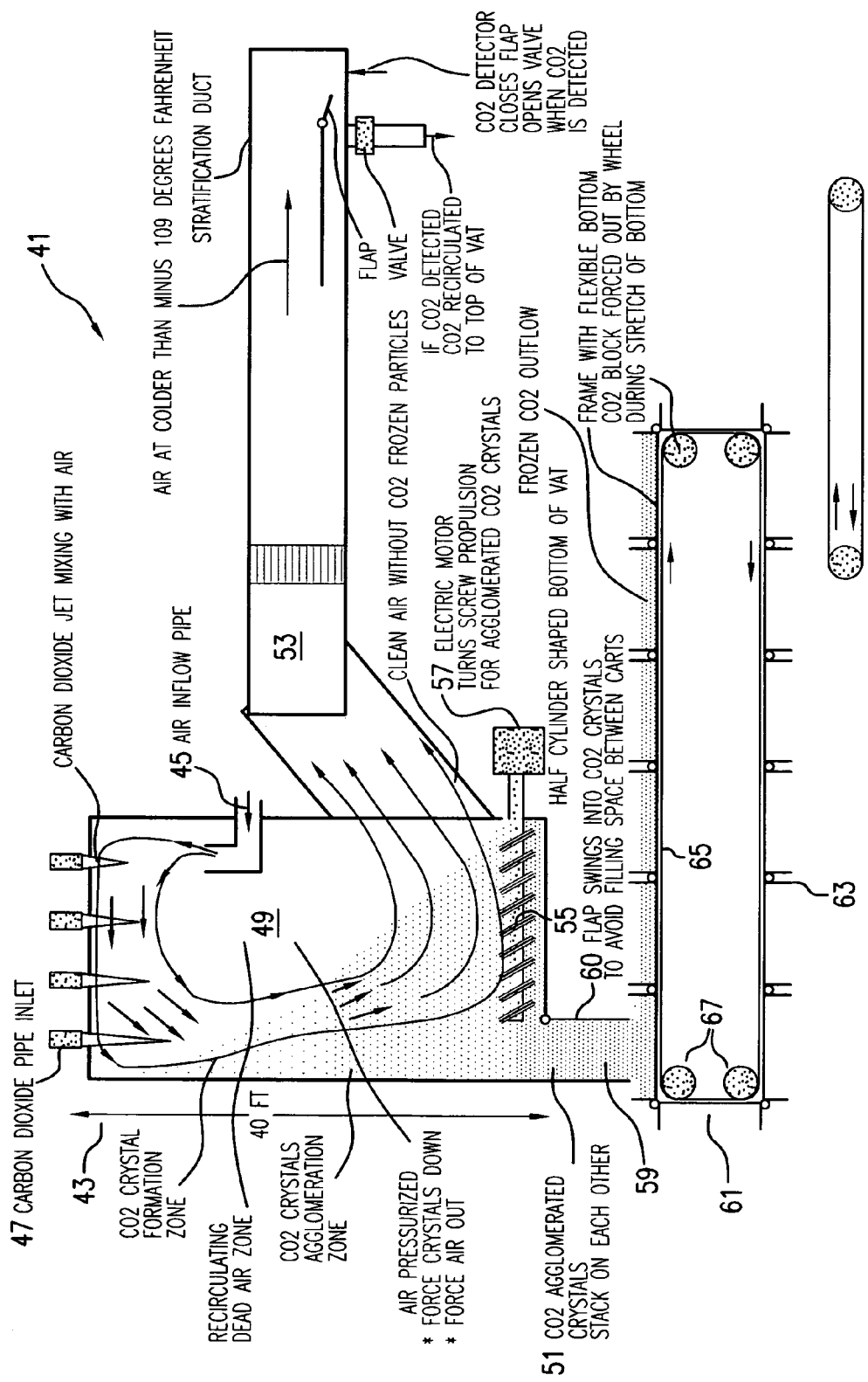
FIG. 4 is a schematic drawing showing an embodiment of the present system having a mixing chamber for mixing the $CO_2$ gas emissions with super chilled air, wherein the chamber has a side duct for separating the chilled air from the frozen $CO_2$ crystals, and wherein the frozen $CO_2$ crystals are allowed to collect at the bottom of the chamber where they can form dry ice blocks for easy transport and storage.

FIG. 4 shows a proposed solution 41 that takes the $CO_2$ gases that are separated from the coal or remaining gases emitted from a coal combustion power plant and freezes it, and stores it. That is, in the proposed solution, the $CO_2$ gas derived from coal using an IGCC system is preferably introduced into a chamber 43 and then chilled and desublimated by interaction with super-chilled air (derived from CTT device 3 or TCAES device 21) to produce frozen carbon dioxide crystals which can be agglomerated to form ice blocks which can then be easily transported and stored. This process eliminates the need to dig mines, use existing caverns, or to find algae deposits, or lime quarries, or build pipelines. Instead, the $CO_2$ gas is frozen into solid blocks of dry ice which can then be delivered to virtually any frozen product facility—for example, those that produce carbonated beverages—which in turn allows the system to become a money making venture—which can offset the high costs associated with separating the $CO_2$ using IGCC, as discussed above.

Generally speaking, the present system incorporates a system for injecting the $CO_2$ gases into chamber 43, along with a predetermined amount of super chilled air, which helps to flash freeze the $CO_2$ gas to form crystals that can then be agglomerated together to form ice blocks. Preferably, the super chilled air is injected upward into chamber 43 through multiple inlets 45 spaced around the perimeter thereof, while the $CO_2$ gas is introduced downward through multiple inlets 47. This way, as the two mix, frozen $CO_2$ crystals can form within dead zone area 49 and be circulated, causing them to agglomerate together. By introducing a volumetric flow of super chilled air at minus 150 degrees F. to minus 180 degrees F., into an insulated mixing chamber 43, and then introducing a volumetric flow of $CO_2$ gas, the temperature of the $CO_2$ gas can be reduced significantly, such as down to minus 109.3 degrees F. or lower. Then, as the $CO_2$ gas mixes with the super chilled air, and freezes due to heat exchange, pure $CO_2$ crystals are formed. Over time, i.e., less than a few seconds, the frozen $CO_2$ crystals agglomerate and fall to the bottom of chamber 43, wherein they collect and form dry ice blocks.

One of the keys is mixing an appropriate percentage of $CO_2$ gas (at room temperature) with an appropriate amount of super chilled air (at minus 150 degrees F. to minus 180 degrees F.) to cause the mixture to reach the appropriate temperature that would result in the formation of frozen $CO_2$ crystals. In this respect, a side duct 53 is preferably provided on the side of chamber 43 which enables the chilled air to pass through chamber 43 and be circulated out, such that the chilled air can cause the $CO_2$ crystals to be pressurized downward (by gravity and inertia), thereby helping to force the frozen $CO_2$ crystals toward the bottom of chamber 43. For this to occur, it is desirable that inlets 47 be located above the outlet (which is side duct 53), such that the air within chamber 43 effectively circulates downward through chamber 43.

The present invention preferably comprises a system that can be used to introduce the $CO_2$ gas and super chilled air in the appropriate amounts and at the appropriate rates to ensure that the final temperature of the $CO_2$ gas crystals that form in chamber 43 will remain at or below minus 109.3 degrees F. In this respect, the $CO_2$ gas and super chilled air are preferably introduced under sufficient pressure to cause them to mix properly and sufficiently, and to transfer the cold temperature of the air to the $CO_2$ gas. The rate and flow of each is preferably predetermined and controlled, as well as the overall size and configuration of chamber 43, and inlet openings 45, 47, so that the resultant mixture reaches the optimum temperature and appropriately sized crystals and properties can be achieved.

The direction that the $CO_2$ gas and super chilled air are introduced into the chamber can contribute to the proper formation of the $CO_2$ crystals and therefore the agglomeration of the ice mass. In this respect, the present invention contemplates both 1) counter-flow and 2) co-flow arrangements. The factors that determine which to use depends on how quickly the $CO_2$ needs to be frozen, which is dependent on the temperature of the $CO_2$ gas and how cold the super chilled air is before they enter into chamber 43, as well as the size of the chamber, how much of each is introduced into chamber 43, and at what rate, etc.

In the counter flow embodiment, the system preferably has a chamber that injects the $CO_2$ gas downward into the chamber, wherein the super chilled air is introduced upward from multiple inlets spaced around the perimeter of the chamber. This is referred to as a counter flow process because the $CO_2$ gas and super chilled air are injected in opposite directions to increase the mixing capability as well as reduce the residence time of the crystals in the chamber. This also reduces the capital investment by reducing the height of the mixing chamber. In the co-flow embodiment, both the $CO_2$ gas and super chilled air are introduced in the same direction which allows for a speedier drop of crystals to the bottom as well as a cyclonic separation of the crystals from the air.

In either case, during the downward flight of the $CO_2$ crystals through the chilled air, the crystals will get colder and agglomerate together as they fall, wherein by the time they reach the bottom, preferably, they will be at the appropriate temperature. Side duct 53 is preferably provided on the side of chamber 43 to allow the chilled air to escape while permitting the $CO_2$ crystals to fall or be projected down to the bottom. This helps to ensure that the crystals are separated from the chilled air, wherein the chilled air can then be directed out of chamber 43 and used for cooling purposes, such as to provide additional cooling for HVAC, refrigeration, air intake to a fuel-driven generator set and/or desalination, which further increases the efficiency of the overall system.

A screw 55 with a motor 57 or other device can be provided at the bottom of chamber 43 to help push the agglomerated $CO_2$ crystals that accumulate at the bottom of chamber 43 through a portal 59 which allows the crystals to fall onto a conveyor system 61 with frames 63 that can be used to form ice blocks. Bottom 65 of chamber 43 is preferably configured with a half cylinder shape that matches the exterior shape of screw 55, such that essentially all of the crystals accumulated at bottom 65 can be pushed through portal 59. Portal 59 can have a door 60 that swings open to allow the agglomerated crystals to fall onto conveyor system 61 at the appropriate time. Preferably, door 60 can be made to operate so that batches of crystals can fall onto conveyor system 61, such as with intermittent gaps, which can help to promote forming distinct ice blocks. Door 60 or edge of portal 59 can be provided at a predetermined height so that as the ice blocks are moved along conveyor system 61, they form slabs having a predetermined thickness. It has been found that it is desirable for the crystal mass at the bottom of the chamber to remain at slightly lower than the freezing temperature of $CO_2$, such that the dry ice blocks will remain frozen while the blocks are being created. For these reasons, it is important that the temperature of the chilled air inside the chamber, and the temperature of the $CO_2$ gas, and the rate of introduction of each, are all controlled to obtain the optimum results.

Flexible frames 63 are preferably provided on flexible conveyor belt 65 with rollers 67, so that as the crystals fall, they are separated by the frames and begin forming distinct ice blocks. The flexibility of belt 65 and frames 63 preferably enable the ice blocks that are formed to be easily released as the conveyor rotates and turns downward, as shown in FIG. 4—at the bottom right corner, i.e., the ice blocks are forced out from between the frames 63 by rollers 67 as belt 65 rotates around. It also enables conveyor system 61 to rotate in a circular fashion, i.e., in an endless loop.

Thereafter, the ice blocks can readily be transported and stored, and/or sold to businesses that may need the $CO_2$ for commercial purposes, including those that use fresh $CO_2$. For example, the carbonated beverage industry will continue to use $CO_2$ to produce soft drinks regardless of where the $CO_2$ comes from, and therefore, if the $CO_2$ that they use can be derived from coal combustion power plants, rather than from a fresh source, the total consumption of $CO_2$ into the atmosphere can be reduced thereby.

FIGS. 5 and 6 show how various components can be added to the CTT device 3 and/or TCAES device 21 to increase the efficiency thereof.

In this respect, FIG. 5 shows CTT device 3, wherein the waste heat from the compressor 75 and turbo compressor 79 can be used to provide heated water to a steam driven turbine generator 89 to increase the efficiency thereof. The energy produced thereby can also be used to power the IGCC system. Also, the chilled air produced by the CTT device can, in addition to being used to freeze $CO_2$ gas as discussed above, be used to provide cool inlet air into an associated fuel driven turbine generator 91. In this respect, it can be seen that increased efficiency is achieved by recycling the heat and energy produced by the CTT device and producing additional energy in the form of electricity which can then be used to power the IGCC system and/or in the form of chilled air to provide additional cooling for HVAC, refrigeration and desalination. This allows for more cost savings to be achieved which can further offset the high cost of separating the $CO_2$ gas from the coal.

In this respect, the present invention preferably incorporates the method and system described in related U.S. Provisional Application Ser. No. 61/195,418, entitled "Method and Apparatus for Using Compressed Air to Increase the Efficiency of a Fuel Driven Turbine Generator." That system relates to an improved method and system for increasing the efficiency of a fuel driven turbine generator wherein the system preferably uses super chilled air from a CTT device to inject cool air into the compressor turbine of a fuel driven turbine generator, for more efficient operation thereof. Unlike previous devices for cooling the inlet air, that system utilizes compressed air expanded by a turbo compressor and turbo expander device to generate super chilled air, wherein the system produces cool dry inlet air that can be drawn into the fuel driven generator 91. By removing the moisture from the inlet air using a centrifuge, when the inlet air is accelerated through the nacelle and into the compressor turbine, no ice particles are formed that could damage the turbine blades.

The chilled air produced by CTT device 21 that exits chamber 43 is preferably mixed in an eductor 85 with ambient air to produce a relatively cool inlet air for introduction into the compressor turbine 92 of the fuel driven turbine generator 91. In such case, the chilled air can be introduced into eductor 85 through one or more openings, wherein the velocity of the super chilled air helps to draw ambient air through the openings and into eductor 85. Then, as the two air masses are mixed together, what emerges is a relatively cool mass flow of air that can be used as the inlet air to increase the efficiency of fuel driven turbine generator 91.

An advantage of producing cool air and using it as the inlet air in the compressor turbine 92 is that the air becomes denser, and has greater mass flow, and therefore, the compressor turbine 92 doesn't have to work as hard to compress an equivalent volume of inlet air into combustion chamber 94. Accordingly, compressor turbine 92 can consume less energy, wherein more energy can become available to drive the electric generator 96, i.e., a greater portion of the energy produced by the system can be used to drive electric generator 96 and produce electricity. What results is that less energy is used to operate compressor turbine 92, which advantageously means that more energy is available to drive electric generator 96, which helps to increase the ability of the system to produce more energy per unit volume of fuel consumed.

Another advantage is that the chilled air can be used to remove the moisture from the inlet air and avoid the creation of ice particles that can damage the turbine blades. This is accomplished by using the chilled air as a means of flash freezing the water vapor within the ambient air and then separating the ice particles (including the solid particulates trapped within the ice particles) from the chilled air. That is, as the warm ambient air is mixed with the chilled air, most of the water vapor that exists within the ambient air can be flash frozen to form tiny ice particles. Then, as the ice particles fall to the bottom of a separation compartment (or centrifuge 87), the cool dry air can be directed into a side duct that extends at about ninety degrees relative to the axis of the centrifuge 87, wherein as the high speed ice particles continue on their straight inertial trajectory, the cool dry air can then turn the corner and pass through the passageway and leave the ice particles behind, thereby producing cool "dry" air.

As discussed, the elimination of ice particles from the cool inlet air not only increases the efficiency of the system but also avoids pitting and causing damage to the turbine blades. The entrance into compressor turbine 92 of fuel driven turbine generator 91 is typically in the shape of a nozzle or nacelle, with a relatively wide opening followed by a relatively narrow nacelle, where the compressor turbine blades are located. Accordingly, as the inlet air is accelerated through the nacelle, an approximately adiabatic acceleration of the drawn-in air results from a constriction of the flow path, wherein this condition is associated with an enthalpy reduction, which in turn, produces a significant temperature drop. Although lower inlet air temperatures resulted in greater system efficiencies, the downside was that if the temperature of the inlet air was reduced to below freezing, ice particles can form that could otherwise strike the turbine blades and cause damage thereto.

Heat exchangers, such as 77, 81 can be used to draw heat produced by air compression away and transfer it to steam turbine generator system 89 and/or chiller system associated therewith to enhance the performance thereof. The heat exchangers preferably comprise a coolant, such as water, that can be channeled through the compressor units to transfer heat from the device to associated steam turbine generator device 89 and/or chiller system. For the steam generator, pre-heated water can be made available for the associated boiler 90 so that the water in the boiler can be brought to boiling using less energy. By withdrawing the heat from the device, and preheating the coolant water, and introducing the coolant water into boiler 90, not only is the steam turbine generator 89 made more efficient, but the entire system can be made more efficient in producing electricity. The steam driven turbine generator 89 can be any conventional type that uses a boiler 90 to create steam, which in turn, drives a steam turbine 86 wherein an electrical generator 88 can be driven to produce electricity.

In another embodiment, the chilled water produced as the ice particles melt in the centrifuge 87 is used to provide cooling for ancillary devices. That is, as the ice particles are collected at the bottom of the centrifuge, they can be thawed to produce chilled water that can be transferred to an associated device such as a thermal energy storage system 84 wherein the chilled water can be stored for later use. Thermal energy storage system 84 preferably comprises a stratification tank in which the chilled water can be stored, and from which the chilled water can be removed to provide cooling for ancillary devices, such as HVAC, refrigeration, air intake to a fuel-driven generator set and/or desalination or the like, etc. After the chilled water is used to provide the necessary cooling for these devices, the water is then recycled back into the stratification tank, wherein by storing the chilled water in this fashion, water can be made available when it is needed—on demand. In an alternate embodiment, the chilled water can be used directly to provide cooling for HVAC, refrigeration, air intake to a fuel-driven generator set and/or desalination or the like, etc., without storing it first.

FIG. 6 shows TCAES device 21, wherein the waste heat from the compressor 103 can be used to provide heated water to a steam driven turbine generator 111 to increase the efficiency thereof. In this embodiment, air is preferably compressed by compressor 103 and compressed air is preferably stored in vessel 105, wherein a control valve 104 controls the passage of the air out of vessel 105, and allows the compressed air to be released by turbo expander 107. The chilled air produced by turbo expander 107 can, in addition to being used to freeze $CO_2$ gas as discussed above, be used to provide cool inlet air into an associated fuel driven turbine generator 115, to increase the efficiency thereof.

In this respect, it can be seen that increased efficiency is achieved by recycling the heat produced by compressor 103 and using it in steam power generator 111, which can generate electricity that can be used to power the IGCC system. The chilled air produced by turbo expander 107 can also be used to provide additional cooling for HVAC, refrigeration, air intake to a fuel-driven generator set and/or desalination, wherein additional electricity can also be generated by generator 109 as turbo expander 107 rotates. This allows for more cost savings to be achieved which can further offset the high cost of separating the $CO_2$ gas from the coal.

In the TCAES device shown in FIG. 6, the chilled air produced by the device and that exits from chamber 43 is preferably mixed with ambient air to produce a relatively cool inlet air for introduction into the compressor turbine of the fuel driven turbine generator 115. In such case, a mixing compartment or inductor 113 is preferably provided, wherein the chilled air can be introduced through one or more openings, and the velocity of the super chilled air can help to draw ambient air through the openings and into inductor 113. Then, as the two air masses are mixed together, what emerges is a relatively cool mass flow of air that can be used as the inlet air to increase the efficiency of the fuel driven turbine generator 115.

Another advantage of this device is that the chilled air can be used to remove the moisture from the inlet air and avoid the creation of ice particles that can damage the turbine blades. This is accomplished by using the chilled air as a means of flash freezing the water vapor within the ambient air and then separating the ice particles (including the solid particulates trapped within the ice particles) from the chilled air. That is, as the warm ambient air is mixed with the chilled air, most of the water vapor that exists within the ambient air can be flash frozen to form tiny ice particles. Then, as the ice particles fall in a separation compartment (or centrifuge 117), the cool dry air can be directed into a side duct or passageway 118 that extends at about ninety degrees relative to the axis of the centrifuge, wherein as the high speed ice particles continue on their straight inertial trajectory, the cool dry air can then turn the corner and pass through the passageway and leave the ice particles behind, thereby producing cool "dry" air.

As discussed, the elimination of ice particles from the cool inlet air not only increases the efficiency of the system but also avoids pitting and causing damage to the turbine blades. The entrance into the fuel driven turbine generator 115 is typically in the shape of a nozzle or nacelle, with a relatively wide opening followed by a relatively narrow nacelle, where the compressor turbine blades are located. Although lower inlet air temperatures resulted in greater system efficiencies, the downside was that if the temperature of the inlet air was reduced to below freezing, ice particles can form that could otherwise strike the turbine blades and cause damage thereto.

As shown in FIG. 6, device 21 preferably begins with compressor 103 that initially pressurizes the air within pressure tank or vessel 105, such as to a pressure of 90 psia, wherein compressor 103 and tank 105 can be provided with a heat exchanger 102 that distributes the heated coolant water to an associated steam turbine generator 111. The heat exchanger preferably comprises a coolant that helps to reduce the temperature of the compressed air as it is being pressurized, wherein cold water (such as at 60 degree F.) can be distributed through the compressor and used as the coolant.

Figure 7:
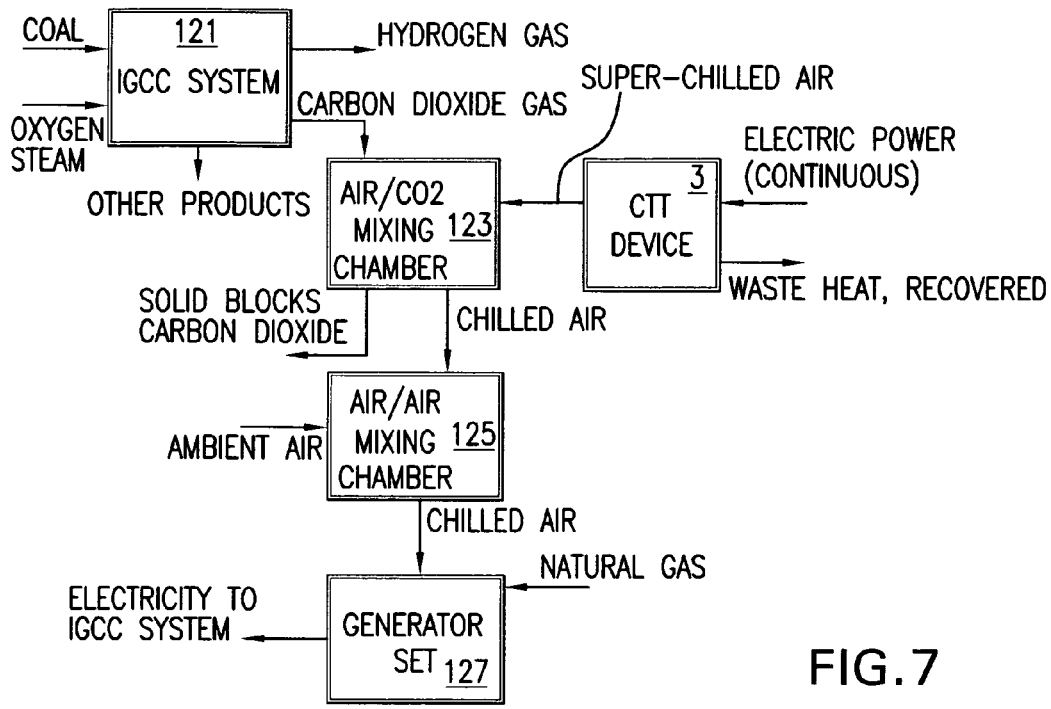
FIG. 7 is a schematic drawing showing how super chilled air generated by the CTT device is mixed with $CO_2$ separated by the IGCC, wherein solid blocks of $CO_2$ are removed from the chamber, and wherein waste heat from the CTT device is recovered, and the remaining chilled air is used as the inlet air for a fuel driven turbine generator.
Figure 8:
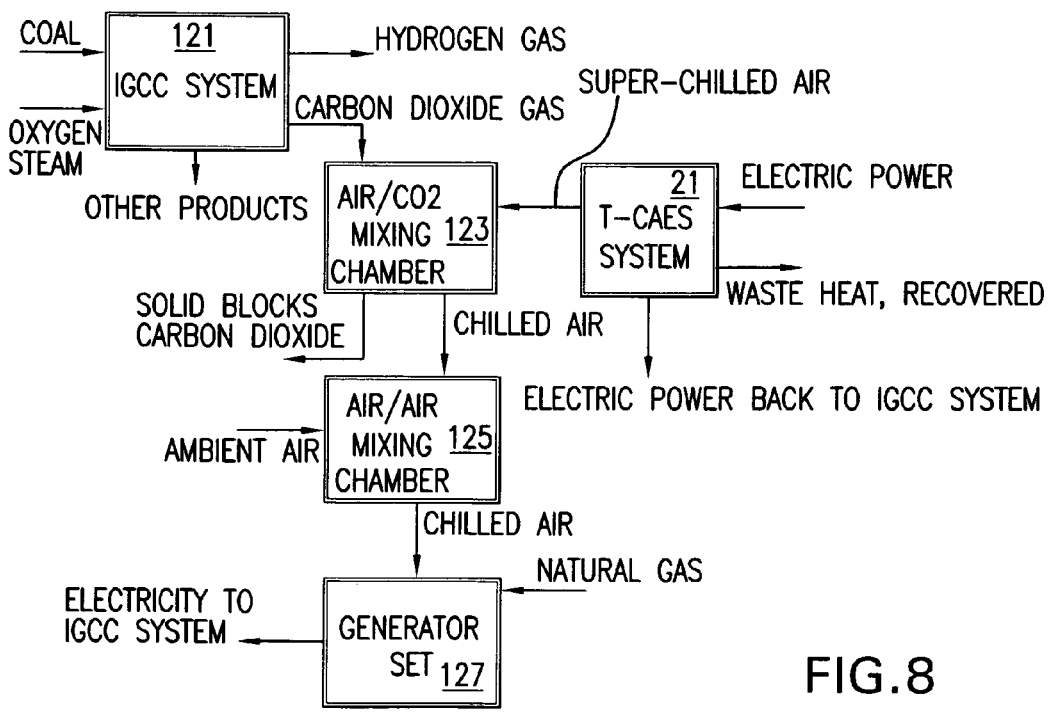
FIG. 8 is a schematic drawing showing how super chilled air generated by the TCAES device is mixed with $CO_2$ separated by IGCC, wherein solid blocks of $CO_2$ are removed from the chamber, and wherein waste heat from the TCAES device is recovered, and the remaining chilled air is used as the inlet air for a fuel driven turbine generator.

FIGS. 7 and 8 schematically show how the various steps are carried out. FIG. 7 shows CTT device 3, and FIG. 8 shows TCAES device 21, wherein $CO_2$ gas is produced by the IGCC system 121, and super chilled air is produced by CTT device 3, or TCAES device 21, as the case may be, and the two are mixed in a mixing chamber 123, wherein solid blocks of carbon dioxide can be produced. The left-over chilled air is then transferred to another mixing chamber or inductor 125, and mixed with ambient air, wherein the chilled air can then be used increase the efficiency of a fuel driven turbine generator 127.

The following two examples are provided to show how the present system can be used to not only separate, capture and store $CO_2$ gas from a coal combustion power plant, but to do so in a manner that generates additional energy which can be used to offset the costs associated with separating $CO_2$ from coal using IGCC. The end result is that the performance of the $CO_2$ capture and storage system of the present invention can have a coefficient of performance as high as 1.7, (more power produced than is absorbed from the primary power plant) wherein the efficiency of the system rivals that of a heat pump.

In the final step, the solid carbon dioxide gas is formed into blocks of dry ice and then transferred from the coal-fired power plant and shipped offsite for use elsewhere, i.e., solid blocks of $CO_2$ are produced and efficiently transported by truck to a commercial facility that can use $CO_2$ in their operations, wherein additional revenue can be obtained therefrom to offset the costs of operating the IGCC system. Moreover, as a result, there is no remaining carbon dioxide footprint at the site.

The two examples include: 1) A simple arrangement of the CTT device which demonstrates the simple energy balance and evaluates the power energy required to transform the carbon dioxide gas into compact blocks of dry ice, and 2) An example that takes into consideration the details of the expansion process that occurs during the trajectory of the high pressure air through the high rotational speed and expanding cross sectional flutes of the radial impeller blades of the turbo expander, wherein the details of this process will demonstrate that it is possible to use off-the-shelf combinations of turbo compressors and turbo expanders located on a common shaft.

Example One

In a simple version of the proposed solution, the CTT device can be located in close proximity to the coal-combustion plant and use a minimal amount of power from the coal-combustion power plant to drive the CTT compressor. In this respect, FIG. 9 shows the compressor, turbo compressor and turbo expander CTT device with their associated heat exchangers, wherein the chart shows the thermodynamic state for each step in the CTT process.

It is an objective of this device to use two commercially available devices: (1) A gas compressor, and (2) A coupled turbo compressor and turbo expander set as a single CTT device to freeze the carbon dioxide derived from the IGCC. FIG. 9 shows how the power available from the turbo expander (28,772 kW) is appropriately matched to the power required by the turbo compressor (minus 27,859 kW). The chart at the top shows the compressor rating at 27,444 kW. However, there is recoverable waste heat of minus 4,115 kW from the compressor and minus 25,042 kW from the turbo compressor. Thus, if there is a nearby steam-driven GenSet or chiller, there is more power output than input, which is the case of most heat pumps. Furthermore, the 487.6 pounds per second of air at minus 109.3 degrees F. is warmed to 32 degrees F., and the chilling capacity is minus 17,445 kW. Thus, the 27,400 kW input generates minus 4,115 kW, minus 25,042, kW and minus 17,445 kW—or 46,602 kW. Accordingly, this system performs like a typical heat pump wherein the coefficient of performance (C.O.P.) equals 46,602 kW/27,400 kW—or 1.7.

The table in FIG. 9 assumes that it will be necessary to have 30 psia exhaust air to operate with high pressure drop losses in the downstream mixing chamber. Thus the pressure drop from 215 psia to 30 psia can result in producing super chilled air at minus 126 degrees F. However, it is possible to reconfigure the CTT device with a different set of pressures so that the pressure drop from 215 psia to 14.67 psia results in super chilled air at minus 173 degrees F.

FIG. 10 shows that the heat balance required by a typical 100 MW power plant that generates 26.53 pounds per second of $CO_2$ requires 487.67 pounds per second of super-chilled air at minus 173 degrees F. FIG. 10 also shows the flow requirements for the CTT device that matches the $CO_2$ effluent of a 100 MW power plant. The cross sectional area requirements for the inlet duct, mixing chamber and outlet ducts are shown in FIGS. 11 and 12.

The following discussion describes the details of each step. The use of one of the several available existing facilities for removing the sulfur compounds and fly ash is described in FIG. 1B. The system of FIG. 1B also removes cooled effluent flue gases of $H_2O$, CO, $CO_2$ and $NO_x$. The result is the separation of $CO_2$ from these gases by these processes. The $CO_2$ gas can next be combined with the exhaust air of the turbo expander to form solid $CO_2$. The frozen $CO_2$ is then removed for commercial purposes in its frozen solid form. There is still chilled air co-generated that is available downstream of the frozen $CO_2$ that can be used for HVAC in a nearby commercial facility or a frozen food locker facility, etc. The coal-burning facility will not be charged with any penalty for $CO_2$ emissions.

FIG. 10 shows the calculations and cross section of a mixing chamber with the injection of super-chilled air and room temperature carbon dioxide gas, with the outflow of chilled air and solid blocks of carbon dioxide. As an example, the power plant is rated at 100 MW and uses 7.24 pounds per second of coal (13,100 BTU/POUND heat release). There are 26.53 pounds of carbon dioxide blocks produced. The 27.4 MW of electrical power (FIG. 9) supplied to the compressor drives the turbo compressor and turbo expander to flow 6,417 standard cubic feet per second, SCFS, of air (FIG. 11) with intake air at 70 degree F. to output air at minus 173 degrees F. The minus 173 degrees F. assumes a smaller pressure rise in the feed compressor, and a pressure drop from 215 psia to 14.67 psia.

Furthermore, the air downstream of the mixing chamber is colder than minus 109.3 degrees F. and can be sent to the HVAC system, or to increase the efficiency of a fuel driven turbine generator. In a practical scenario, minor inefficiencies need to be taken into account. There are energies that must be invested at the startup to chill down the hardware, there are losses due to pressure drops, and not all the mixing between the carbon dioxide and air is perfect. Thus, slightly more air needs to be used to assure the freezing of all the carbon dioxide.

Excess super-chilled air is used to assure that the $CO_2$ remains frozen during all the later steps in the handling and shipping of the frozen $CO_2$. The residual exhaust air from the $CO_2$ freezing process is high mass flow at colder than minus 109.3 degrees F. This chilling potential of the residual air flow can be further utilized for cold storage facilities, air conditioning, refrigeration, air intake to a fuel-driven generator set and/or and desalination. Industrial and commercial cold storage facilities can be co-located in the proximity of the coal-burning power plant to enhance the efficiency of the operation.

The size of the duct in which the $CO_2$ flows from the power plant to the mixing chamber and the size of the duct flowing air are calculated in FIG. 11. The room temperature $CO_2$ duct velocity is restricted to no more than 20 ft/sec to avoid excessive pressure drop, then it is necessary to consider 14 pipes, each at one foot in diameter. The bounding duct size choices for the air flow are shown in FIG. 11. One can use six 10.7 feet diameter or one 18.5 feet diameter duct to transmit the cold air. This depends upon the real estate available at the site.

Example Two

This example considers the limitations imposed by the compression available across each turbo compressor impeller disc and imposed by the expansion available across each turbo expander impeller disc. In particular, the boundary layer attached to each wall of the fluted vane is limited in terms of pressure ratio before it detaches from the wall. Furthermore, since there is power transfer from the turbo expander to the turbo compressor during its steady state "free spooling" mode, it is necessary to match two sets of turbo expander and turbo compressor combinations, wherein each combination has a separate power rating.

FIG. 13 shows the compressor intake of 14.696 psia and 70 degrees F. ambient air (Point A) to 50 psia and 247 degrees F. compressed air (Point C). The isentropic compression process would have resulted in a higher temperature of 291 degrees F. However, there were temperature drops related to the imperfect compression process and heat transfer to the body of the compressor or 20% of the input power. Coolant water absorbs some of the 10.654 BTU/pound of enthalpy.

When the compressed air is cooled from 247 degrees F. to 70 degrees F., with little pressure drop, 42.87 BTU/pound of enthalpy is available to heat the air. This 50-psia and 70 degrees F. air is available for driving the downstream T/T system. When electrical power is supplied to the compressor, the compressed air from the compressor drives the two stages of turbo compressor and two stages of turbo expander. Note that turbo compressor #1 and turbo expander #1 are hard coupled by a common shaft so that turbo expander #1 drives turbo compressor #1 as it expands the air passing through its impeller. Also note that turbo compressor #2 and turbo expander #2 are hard coupled by a common shaft so that turbo expander #2 drives turbo compressor #2 as it expands the air passing through its impeller.

There are a series of heat exchangers that are available to cool the hot compressed air so that the final expanded air achieves super-chilled states. These heat exchangers transfer their heated water to either the nearby steam-driven generator set or to a heat-driven absorption chiller. FIG. 14 defines the pressure and temperature state for each position. Note that this equilibrium state couples the 35.037 BTU/pound turbo expander to the 35.51 BTU/pound turbo compressor in its free-spooling mode; and the 16.2486 BTU/pound turbo expander to the 16.15 BTU/pound turbo compressor in its free-spooling mode. Further iteration to achieve closer agreement would require estimates of real-world losses. This is sufficient for the initial design.

Also note that in this example the final state delivers the airflow at 24 psia and minus 148.35 degrees F. This excess overpressure compared to ambient will serve to drive the downstream eductor that will entrain the local ambient carbon dioxide gas for mixing to form the dry ice (solid $CO_2$). To specify the kW size of T/T combinations required by the system to the turbo-machinery manufacturer, one can multiply the BTU/pound differences between thermodynamic state points and the pounds/hour of airflow. Then convert the resultant BTU/hour into units of kilowatts. The 135 psia air is compressed and reaches 218 degrees F. (State 2). Coolant water is used to chill the air to 70 degrees F. and the compressed air remains at about 135 psia (State 3). This coolant water is used by nearby steam-driven generator set or absorption chiller.

The 135 psia and 70 degrees F. air is then pressurized to 220 psia and 138 degrees F. with 15% of the energy developed by friction and absorbed by coolant water as waste heat that can be used by nearby steam-driven generator set (GenSet) or chiller. Coolant water is then used to chill the 220 psia and 138 degrees F. air (State 4) to 70 degrees F., which remains at about 220 psia (State 5). This coolant water is used by nearby steam-driven generator set or absorption chiller.

The first stage of expansion in the turbo expander expands the 220 psia and 70 degrees F. to 55 psia and minus 79 degrees F. (State 6) with 15% of the energy developed by friction and absorbed by coolant water as waste heat that can be used by nearby steam-driven generator set (GenSet) or absorption chiller. The second stage of expansion in the turbo expander expands the 55 psia and minus 79 degrees F. to 24 psia and minus 148 degrees F. (State 7) with 15% of the energy developed by friction and absorbed by coolant water as waste heat that can be used by nearby steam-driven generator set (GenSet) or absorption chiller.

This design uses 24 psia as a target pressure so that the exhausting chilled air has sufficient kinetic energy to aspirate the surrounding carbon dioxide gas info a mixing duct (eductor). However, colder air temperatures can be achieved if this design pressure is dropped from 24 psia to 15 psia, although this would require a rebalance of the T/T device.

The rebalance is explained as follows: Note that turbo expander #1 drives the turbo compressor #1 with a required power of 35 BTU/pound. Note also that turbo expander #2 drives turbo compressor #2 with a required power of 16 BTU/pound.

To derive the kilowatts required by the compressor and each of the sets of T/T, one needs only to multiply the required airflow in pounds per second (#/sec) by the difference in enthalpies per unit mass (BTU/#) to derive the BTU/sec or kW ratings.

We claim:

1. A system for removing carbon dioxide gas from a coal combustion power plant comprising:
   a. separating carbon dioxide gas from the combustion of coal used in the power plant and/or the flue emissions from the power plant;
   b. at least one turbo compressor compressing air, wherein the compressed air is sent to at least one turbo expander
   c. the at least one turbo expander releasing the compressed air, wherein the released compressed air is super chilled air as a by-product thereby;
   d. recycling heated or cooled air generated by the turbo compressor or turbo expander to generate additional electricity and/or cool air for HVAC, refrigeration or desalination, wherein recycling the heated or cooled air increases efficiency of removing carbon dioxide gas from a coal combustion power plant;
   e. injecting the carbon dioxide gas and the super chilled air into a chamber having a portal, at least one rotating screw, and at least one motor rotating the at least one rotating screw, wherein the bottom of the chamber is contoured to match an exterior of the at least one rotating screw, wherein the carbon dioxide gas and the super chilled air mix to form carbon dioxide crystals, wherein the carbon dioxide crystals fall toward a bottom of the chamber, wherein agglomerated carbon dioxide crystals are moved within the chamber by the at least one rotating screw towards the portal, and wherein a door on the portal opens intermittently to create batches of agglomerated crystals;
   f. allowing the batches of agglomerated carbon dioxide crystals to fall onto a conveyor belt extended around two or more rollers, wherein multiple frames extend from the conveyor belt at a predetermined distance apart from each other, wherein the conveyor belt is at the bottom of the chamber; and
   g. the multiple frames forming individual ice blocks with the agglomerated carbon dioxide crystals, and wherein the agglomerated carbon dioxide crystals are directed to the conveyor belt between each of the multiple frames, wherein the carbon dioxide crystals are maintained at equal to or less than minus 109.3 degrees F. as they agglomerate within the chamber, and as the ice blocks are being transported and/or stored, and wherein a portion of the super chilled air is combined with ambient air in an inductor forming cool air relative to the ambient air, wherein the cool air is fed into a gas turbine generator set to produce additional electricity.

2. A system for removing carbon dioxide gas from a coal combustion power plant comprising:
   a. separating carbon dioxide gas from the combustion of coal used in the power plant and/or the flue emissions from the power plant;
   b. at least one turbo compressor compressing air, wherein the compressed air is sent to at least one turbo expander
   c. the at least one turbo expander releasing the compressed air, wherein the released compressed air is super chilled air as a by-product thereby;
   d. recycling heated or cooled air generated by the turbo compressor or turbo expander to generate additional electricity and/or cool air for HVAC, refrigeration or desalination, wherein recycling the heated or cooled air increases efficiency of removing carbon dioxide gas from a coal combustion power plant;
   e. injecting the carbon dioxide gas and the super chilled air into a chamber having a portal and a dead air zone within the chamber, wherein the super chilled air mixes with the carbon dioxide gas forming the carbon dioxide crystals, wherein the super chilled air in the chamber is directed through a side duct extending along the side of the chamber, wherein the super chilled air can be used to provide cooling for HVAC, refrigeration, air intake to a fuel-driven generator set and/or desalination, and wherein the carbon dioxide crystals fall toward a bottom of the chamber;
   f. allowing the carbon dioxide crystals to fall onto a conveyor belt extended around two or more rollers, wherein multiple frames extend from the conveyor belt at a predetermined distance apart from each other, wherein the conveyor belt is at the bottom of the chamber; and
   g. the multiple frames forming individual ice blocks with the agglomerated crystals, and wherein the agglomerated crystals are directed to the conveyor belt between each of the multiple frames.

* * * * *